US012094444B2

(12) United States Patent
Zheng et al.

(10) Patent No.: US 12,094,444 B2
(45) Date of Patent: Sep. 17, 2024

(54) EARPHONES

(71) Applicant: SHENZHEN SHOKZ CO., LTD., Guangdong (CN)

(72) Inventors: Jinbo Zheng, Shenzhen (CN); Chengqian Zhang, Shenzhen (CN); Le Xiao, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 175 days.

(21) Appl. No.: 18/047,639

(22) Filed: Oct. 18, 2022

(65) Prior Publication Data

US 2023/0063283 A1 Mar. 2, 2023

Related U.S. Application Data

(63) Continuation of application No. PCT/CN2021/131927, filed on Nov. 19, 2021.

(30) Foreign Application Priority Data

Apr. 25, 2021 (WO) ................ PCT/CN2021/089670
Apr. 30, 2021 (WO) ................ PCT/CN2021/091652
Jul. 29, 2021 (WO) ................ PCT/CN2021/109154

(51) Int. Cl.
*H04R 1/10* (2006.01)
*G10K 11/178* (2006.01)
(Continued)

(52) U.S. Cl.
CPC .. *G10K 11/17823* (2018.01); *G10K 11/17873* (2018.01); *H04R 1/1008* (2013.01);
(Continued)

(58) Field of Classification Search
CPC .... H04R 1/1008; H04R 1/105; H04R 1/1066; H04R 1/406; H04R 3/005; H04R 2460/09;
(Continued)

(56) References Cited

U.S. PATENT DOCUMENTS 8,442,252 B2 5/2013 Meosky et al.
10,827,246 B1 11/2020 Oommen et al.
(Continued)

FOREIGN PATENT DOCUMENTS

CN 202931524 U 5/2013
CN 204539469 U 8/2015
(Continued)

OTHER PUBLICATIONS

International Search Report in PCT/CN2021/131927 mailed on Feb. 7, 2022, 6 pages.
(Continued)

*Primary Examiner* — William A Jerez Lora
(74) *Attorney, Agent, or Firm* — METIS IP LLC

(57) ABSTRACT

Embodiments of the present disclosure disclose an earphone including a fixing structure, a first microphone array, a processor, and a speaker. The fixing structure is configured to fix the earphone near a user's ear without blocking the user's ear canal and including a hook-shaped component and a body part. The first microphone array is located in the body part and is configured to pick up environmental noise. The processor is located in the hook-shaped component or the body part and is configured to estimate a sound field at a target spatial position using the first microphone array and generate a noise reduction signal based on the estimated sound field. The target spatial position is closer to the user's ear canal than any microphone in the first microphone array.
(Continued)

300

The speaker is located in the body part and is configured to output a target signal according to the noise reduction signal.

20 Claims, 19 Drawing Sheets

(51) Int. Cl.
*H04R 1/40* (2006.01)
*H04R 3/00* (2006.01)

(52) U.S. Cl.
CPC .......... *H04R 1/105* (2013.01); *H04R 1/1066* (2013.01); *H04R 1/406* (2013.01); *H04R 3/005* (2013.01); *G10K 2210/1081* (2013.01); *G10K 2210/3023* (2013.01); *G10K 2210/3056* (2013.01); *H04R 2460/09* (2013.01); *H04R 2460/11* (2013.01); *H04R 2460/13* (2013.01)

(58) Field of Classification Search
CPC ........... H04R 2460/11; H04R 2460/13; G10K 11/17823; G10K 11/17873; G10K 2210/1081; G10K 2210/3023; G10K 2210/3056
USPC .......................... 381/71.1, 91, 122, 330, 381
See application file for complete search history.

(56) References Cited

U.S. PATENT DOCUMENTS

2009/0067658 A1* 3/2009 Lin ...................... H04R 1/2842 381/345
2009/0262951 A1 10/2009 Togawa et al.
2012/0057718 A1 3/2012 Vernon
2014/0141724 A1 5/2014 Liu et al.
2016/0134957 A1 5/2016 Jentz et al.
2017/0034611 A1 2/2017 Maruyama
2017/0048603 A1 2/2017 Matsuo et al.
2017/0357214 A1 12/2017 Choi et al.
2018/0033419 A1 2/2018 Shetye et al.
2018/0077478 A1 3/2018 Willis et al.
2018/0151172 A1 5/2018 Min
2019/0253805 A1 8/2019 Wakeland et al.
2019/0304431 A1 10/2019 Cardinaux et al.
2020/0027437 A1 1/2020 Park et al.
2020/0143790 A1 5/2020 Trivedi et al.
2020/0202839 A1 6/2020 Asada et al.
2020/0258539 A1 8/2020 Shim et al.
2020/0267464 A1* 8/2020 Graff .................... H04R 1/1008
2020/0302946 A1 9/2020 Jhawar et al.
2020/0329317 A1 10/2020 Chiu et al.
2021/0019108 A1 1/2021 Smith et al.
2021/0067857 A1 3/2021 Struzik
2021/0076118 A1 3/2021 Struzik et al.
2021/0112329 A1 4/2021 Zhang et al.
2021/0219043 A1 7/2021 Li et al.
2021/0227311 A1* 7/2021 Minarsch ............. H04R 1/1041
2021/0345036 A1* 11/2021 Van Hook ............ H04R 1/2849
2023/0066263 A1 3/2023 Zhang et al.

FOREIGN PATENT DOCUMENTS

CN 104883635 A 9/2015
CN 107346664 A 11/2017
CN 107452375 A 12/2017
CN 107682765 A 2/2018
CN 108235165 A 6/2018
CN 108668188 A 10/2018
CN 110225430 A 9/2019
CN 111010642 A 4/2020
CN 210868165 U 6/2020
CN 211152175 U 7/2020
CN 111935589 A 11/2020
CN 111954121 A 11/2020
CN 111954142 A 11/2020
CN 112102806 A 12/2020
EP 3684071 A1 7/2020
EP 3687193 A1 7/2020
GB 2522760 A 8/2015
JP 2020018015 A 1/2020
WO 2008029336 A1 3/2008
WO 2019089585 A1 5/2019
WO 2019126402 A1 6/2019
WO 2019202840 A1 10/2019
WO 2020102224 A1 5/2020
WO 2020221359 A1 11/2020

OTHER PUBLICATIONS

International Search Report in PCT/CN2021/109154 mailed on Nov. 3, 2021, 7 pages.
International Search Report in PCT/CN2021/089670 mailed on Aug. 16, 2021, 6 pages.
International Search Report in PCT/CN2021/091652 mailed on Jun. 29, 2021, 6 pages.
Notice of Preliminary Rejection in Korean Application No. 10-2022-7044224 mailed on Dec. 19, 2023, 10 pages.
Notice of Rejection in Japanese Application No. 2022580472 mailed on Mar. 4, 2024, 8 pages.
Decision of Grant in Russian Application No. 2022128685 mailed on Oct. 10, 2023, 28 pages.
Office Action in Russian Application No. 2022128685 mailed on Jul. 4, 2023, 28 pages.
The Extended European Search Report in European Application No. 21938133.2 mailed on Nov. 8, 2023, 10 pages.

* cited by examiner

200

EARPHONES

CROSS-REFERENCE TO RELATED APPLICATIONS

This application is a continuation of International Patent Application No. PCT/CN2021/131927, filed on Nov. 19, 2021, which claims priority of International Application No. PCT/CN2021/109154, filed on Jul. 29, 2021, International Application No. PCT/CN2021/089670, filed on Apr. 25, 2021, International Application No. PCT/CN2021/091652, filed on Apr. 30, 2021, the entire contents of each of which are hereby incorporated by reference.

TECHNICAL FIELD

The present disclosure relates the acoustic field, and in particular, to earphones.

BACKGROUND

Active noise reduction technology is a technology that uses a speaker of an earphone to output sound waves opposite to external environmental noise to cancel the environmental noise. Earphones may usually be divided into two types including in-ear earphones and open earphones. An in-ear earphone may block a user's ear during use, and the user is likely to have feelings of blockage, foreign matters, swelling, pain, etc., when wearing the in-ear earphone for a long time. An open earphone may not block the user's ears, which is good for long-term wearing. However, when the external noise is relatively large, the noise reduction performance of the open earphone may be not obvious, which may reduce the user's listening experience.

Therefore, it is desirable to provide an earphone and a noise reduction method, which can allow the user's ears being unblocked and improve the user's listening experience.

SUMMARY

Some embodiments of the present disclosure provide an earphone. The earphone may include: a fixing structure configured to fix the earphone near a user's ear without blocking the user's ear canal and including a hook-shaped component and a body part, wherein when the user wears the earphone, the hook-shaped component is hung between a first side of the ear and a head of the user, and the body part contacts a second side of the ear; a first microphone array located in the body part and configured to pick up environmental noise; a processor located in the hook-shaped component or the body part and configured to: estimate a sound field at a target spatial position using the first microphone array, the target spatial position being closer to the user's ear canal than any microphone in the first microphone array, and generate, based on the estimated sound field at the target spatial position, a noise reduction signal; and a speaker located in the body part and configured to output a target signal according to the noise reduction signal, the target signal being transmitted to outside of the earphone through a sound outlet hole for reducing the environmental noise.

In some embodiments, the body part may include a connecting component and a holding component. When the user wears the earphone, the holding component may contact the second side of the ear, and the connecting component may connect the hook-shaped component and the holding component.

In some embodiments, when the user wears the earphone, the connecting component may extend from the first side of the ear to the second side of the ear, the connecting component may cooperate with the hook-shaped component to provide the holding component with a pressing force on the second side of the ear, and the connecting component may cooperate with the holding component to provide the hook-shaped component with a pressing force on the first side of the ear.

In some embodiments, in a direction from a first connection point between the hook-shaped component and the connecting component to a free end of the hook-shaped component, the hook-shaped component may be bent towards the first side of the ear to form a first contact point with the first side of the ear, and the holding component may form a second contact point with the second side of the ear. A distance between the first contact point and the second contact point along an extension direction of the connecting component in a natural state may be smaller than a distance between the first contact point and the second contact point along the extension direction of the connecting component in a wearing state to provide the holding component with a pressing force on the second side of the ear and provide the hook-shaped component with the pressing force on the first side of the ear.

In some embodiments, in a direction from a first connection point between the hook-shaped component and the connecting component to a free end of the hook-shaped component, the hook-shaped component may be bent towards the head to form a first contact point and a third contact point with the head. The first contact point is located between the third contact point and the first connection point, so that the hook-shaped component forms a lever structure with the first contact point as a fulcrum. A force directed towards outside of the head and provided by the head at the third contact point may be converted by the lever structure into a force directed to the head at the first connection point, and the force directed to the head at the first connection point may provide the holding component with the pressing force on the second side of the ear via the connecting component.

In some embodiments, the speaker may be disposed in the holding component, and the holding component may have a multi-segment structure to adjust a relative position of the speaker on an overall structure of the earphone.

In some embodiments, the holding component may include a first holding segment, a second holding segment, and a third holding segment that are connected end to end in sequence. One end of the first holding segment facing away from the second holding segment may be connected to the connecting component. The second holding segment may be folded back relative to the first holding segment and may maintain a distance away from the first holding segment to make the first holding segment and the second holding segment be in a U-shaped structure. The speaker may be arranged in the third holding segment.

In some embodiments, the holding component may include a first holding segment, a second holding segment, and a third holding segment that are connected end to end in sequence. One end of the first holding segment facing away from the second holding segment may be connected to the connecting component. The second holding segment may be bent relative to the first holding segment. The third holding segment and the first holding segment may be disposed side by side with each other at a distance. The speaker may be disposed in the third holding segment.

In some embodiments, the sound outlet hole may be provided on a side of the holding component facing the ear to make the target signal output by the speaker be transmitted to the ear through the sound outlet hole.

In some embodiments, the side of the holding component facing the ear may include a first region and a second region. The first region may be provided with the sound outlet hole. The second region may be farther away from the connecting component than the first region and may protrude more toward the ear than the first region, so as to allow the sound outlet hole to be spaced from the ear in a wearing state.

In some embodiments, when the user wears the earphone, a distance between the sound outlet hole and the user's ear canal may be less than 10 mm.

In some embodiments, a pressure relief hole may be provided on a side of the holding component along a vertical axis direction and close to a top of the user's head. The pressure relief hole may be farther away from the user's ear canal than the sound outlet hole.

In some embodiments, when the user wears the earphone, a distance between the pressure relief hole and the user's ear canal may be in a range of 5 mm to 15 mm.

In some embodiments, an included angle between a connection line between the pressure relief hole and the sound outlet hole and a thickness direction of the holding component may be in a range of 0° to 50°.

In some embodiments, the pressure relief hole and the sound outlet hole may form an acoustic dipole. The first microphone array may be disposed in a first target region. The first target region may be an acoustic zero point position of a radiated sound field of the acoustic dipole.

In some embodiments, the first microphone array may be located in the connecting component.

In some embodiments, a first included angle may be formed between a connection line between the first microphone array and the sound outlet hole and a connection line between the sound outlet hole and the pressure relief hole. A second included angle may be formed between a connection line between the first microphone array and the pressure relief hole and the connection line between the sound outlet hole and the pressure relief hole. A difference between the first included angle and the second included angle may be less than or equal to 30°.

In some embodiments, a distance between the first microphone array and the sound outlet hole may be a first distance. A distance between the first microphone array and the pressure relief hole may be a second distance. A difference between the first distance and the second distance may be less than or equal to 6 mm.

In some embodiments, the generating, based on the estimated sound field at the target spatial position, a noise reduction signal may include: estimating, based on the picked-up environmental noise, noise at the target spatial position; and generating, based on the noise at the target spatial position and the estimated sound field at the target spatial position, the noise reduction signal.

In some embodiments, the earphone may further include one or more sensors located in the hook-shaped component and/or the body part and configured to obtain motion information of the earphone. The processor may be further configured to: update, based on the motion information, the noise at the target spatial position and the estimated sound field at the target spatial position; and generate, based on the updated noise at the target spatial position and the updated estimated sound field at the target spatial position, the noise reduction signal.

In some embodiments, the estimating, based on the picked-up environmental noise, noise at the target spatial position may include: determining one or more spatial noise sources associated with the picked-up environmental noise; and estimating, based on the one or more spatial noise sources, the noise at the target spatial position.

In some embodiments, the estimating a sound field at a target spatial position using the first microphone array may include: constructing, based on the first microphone array, a virtual microphone, wherein the virtual microphone includes a mathematical model or a machine learning model and is configured to represent audio data collected by the microphone if the target spatial position includes the microphone; and estimating, based on the virtual microphone, the sound field of the target spatial position.

In some embodiments, the generating, based on the estimated sound field at the target spatial position, a noise reduction signal may include: estimating, based on the virtual microphone, noise at the target spatial position; and generating, based on the noise at the target spatial position and the estimated sound field at the target spatial position, the noise reduction signal.

In some embodiments, the earphone may include a second microphone located in the body part and configured to pick up the environmental noise and the target signal. The processor may be configured to: update, based on a sound signal picked up by the second microphone, the noise reduction signal.

In some embodiments, the second microphone may include at least one microphone closer to the user's ear canal than any microphone in the first microphone array.

In some embodiments, the second microphone may be disposed in a second target region, and the second target area may be a region on the holding component close to the user's ear canal.

In some embodiments, when the user wears the earphone, a distance between the second microphone and the user's ear canal may be less than 10 mm.

In some embodiments, on a sagittal plane of the user, a distance between the second microphone and the sound outlet hole along a sagittal axis direction may be less than 10 mm.

In some embodiments, on a sagittal plane of the user, a distance between the second microphone and the sound outlet hole along a vertical axis direction may be in a range of 2 mm to 5 mm.

In some embodiments, the updating, based on a sound signal picked up by the second microphone, the sound reduction signal may include: estimating, based on the sound signal picked up by the second microphone, a sound field at the user's ear canal; and updating, according to the sound field at the user's ear canal, the noise reduction signal.

In some embodiments, the generating, based on the estimated sound field at the target spatial position, a noise reduction signal may include: dividing the picked-up environmental noise into a plurality of frequency bands, the plurality of frequency bands corresponding to different frequency ranges; and generating, based on at least one of the plurality of frequency bands, the noise reduction signal corresponding to each of the at least one frequency band.

In some embodiments, the generating, based on at least one of the plurality of frequency bands, the noise reduction signal corresponding to each of the at least one frequency band may include: obtaining sound pressure levels of the plurality of frequency bands; and generating, based on the sound pressure levels of the plurality of frequency bands and the frequency ranges of the plurality of frequency bands, the noise reduction signal corresponding to each of the at least one frequency band, wherein the at least one frequency band is part of the plurality of frequency bands.

In some embodiments, the first microphone array may include a bone conduction microphone configured to pick up a voice of the user, and the estimating, based on the picked-up environmental noise, noise at the target spatial position may include: removing components associated with a signal picked up by the bone conduction microphone from the picked up environmental noise to update the environmental noise; and estimating, based on the updated environmental noise, the noise at the target spatial position.

In some embodiments, the earphone may further include an adjustment module configured to obtain an input of a user. The processor may be further configured to adjust the noise reduction signal according to the input of the user.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
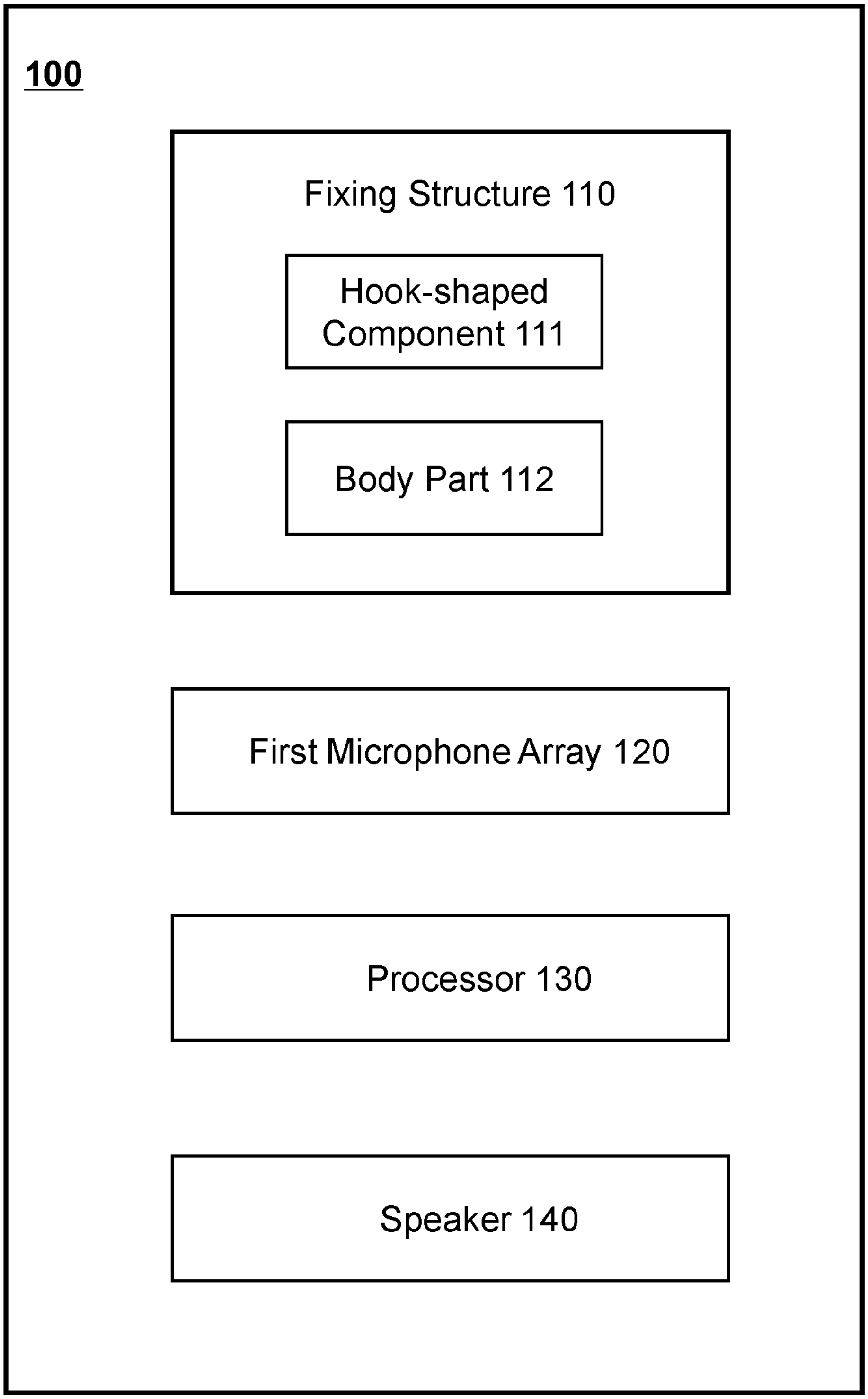
FIG. 1 is a block diagram illustrating an exemplary earphone according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the “system,” “device,” “unit,” and/or “module” used herein are one method to distinguish different components, elements, parts, sections, or assemblies of different levels. However, if other words can achieve the same purpose, the words can be replaced by other expressions.

As used in the disclosure and the appended claims, the singular forms “a,” “an,” and “the” include plural referents unless the content clearly dictates otherwise; the plural forms may be intended to include singular forms as well. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

Some embodiments of the present disclosure provide an earphone. The earphone may be an open earphone. The open earphone may fix a speaker near a user’s ear through a fixing structure without blocking the user’s ear canal. In some embodiments, the earphone may include the fixing structure, a first microphone array, a processor, and a speaker. The fixing structure may be configured to fix the earphone near a user’s ear without blocking the user’s ear canal. The first microphone array, the processor, and the speaker may be located in the fixing structure to implement an active noise reduction function of the earphone. In some embodiments, the fixing structure may include a hook-shaped component and a body part. When the user wears the earphone, the hook-shaped component may be hung between a first side of the ear and the head of the user, and the body part may contact a second side of the ear. In some embodiments, the body part may include a connecting component and a holding component. When the user wears the earphone, the holding component may contact the second side of the ear, and the connecting component may connect the hook-shaped component and the holding component. The connecting component may extend from the first side of the ear to the second side of the ear, and the connecting component may cooperate with the hook-shaped component to provide the holding component with a pressing force on the second side of the ear. The connecting component may cooperate with the holding component to provide the hook-shaped component with a pressing force on the first side of the ear, so that the earphone may clamp the user's ear, and the wearing stability of the earphone may be ensured. In some embodiments, the first microphone array located in the body part of the earphone may be configured to pick up environmental noise. The processor located in the hook-shaped component or the body part of the earphone may be configured to estimate a sound field at a target spatial position. The target spatial position may include a spatial position close to the user's ear canal at a specific distance. For example, the target spatial position may be closer to the user's ear canal than any microphone in the first microphone array. It may be understood that each microphone in the first microphone array may be distributed at different positions near the user's ear canal. The processor may estimate a sound field at a position close to the user's ear canal (e.g., the target spatial position) according to the environmental noise collected by each microphone in the first microphone array. The speaker may be located in the body part (the holding component) and configured to output a target signal according to a noise reduction signal. The target signal may be transmitted to outside of the earphone through a sound outlet hole on the holding component for reducing the environmental noise heard by the user.

In some embodiments, in order to better reduce the environmental noise heard by the user, the body part may include a second microphone. The second microphone may be closer to the user's ear canal than the first microphone array. A sound signal collected by the second microphone may be more consistent with the sound heard by the user and reflect the sound heard by the user. The processor may update the noise reduction signal according to the sound signal collected by the second microphone, so as to achieve a more ideal noise reduction effect.

It should be known that the earphone provided in the embodiments of the present disclosure can be fixed near the user's ear through the fixing structure without blocking the user's ear canal, which may allow the user's ears being unblocked and improve the stability and comfort of the earphone in wearing. At the same time, the sound field close to the user's ear canal (e.g., the target spatial position) may be estimated using the first microphone array and/or the second microphone located in the fixing structure (such as the body part) and the processor, and the environmental noise at the user's ear canal may be reduced using the target signal output by the speaker, thereby realizing the active noise reduction of the earphone, and improving the user's listening experience in a process of using the earphone.

FIG. 1 is a block diagram illustrating an exemplary earphone according to some embodiments of the present disclosure.

In some embodiments, the earphone 100 may include a fixing structure 110, a first microphone array 120, a processor 130, and a speaker 140. The first microphone array 120, the processor 130, and the speaker 140 may be located in the fixing structure 110. The earphone 100 may clamp the user's ear through the fixing structure 110 to fix the earphone 100 near a user's ear without blocking a user's ear canal. In some embodiments, the first microphone array 120 located in the fixing structure 110 (e.g., the body part) may pick up external environmental noise, convert the environmental noise into an electrical signal, and transmit the electrical signal to the processor 130 for processing. The processor 130 may be coupled (e.g., electrically connected) to the first microphone array 120 and the speaker 140. The processor 130 may receive and process the electrical signal transmitted by the first microphone array 120 to generate a noise reduction signal, and transmit the generated noise reduction signal to the speaker 140. The speaker 140 may output a target signal according to the noise reduction signal. The target signal may be transmitted to outside of the earphone 100 through a sound outlet hole on the fixing structure 110 (e.g., the holding component), and may be configured to reduce or cancel the environmental noise at the user's ear canal (e.g., a target spatial position), thereby achieving active noise reduction of the earphone 100, and improving the user's listening experience in a process of using the earphone 100.

In some embodiments, the fixing structure 110 may include a hook-shaped component 111 and a body part 112. When the user wears the earphone 100, the hook-shaped component 111 may be hung between a first side of the ear and the head of the user, and the body part 112 may contact a second side of the ear. The first side of the ear may be a rear side of the user's ear. The second side of the user's ear may be a front side of the user's ear. The front side of the user's ear may refer to a side of the user's ear including parts such as a cymba conchae, a triangular fossa, an antihelix, a scapha, a helix, etc. (see FIG. 2 for a structure of an ear). The rear side of the user's ear may refer to a side of the user's ear that is away from the front side, i.e., a side opposite to the front side.

In some embodiments, the body part 112 may include a connecting component and a holding component. When the user wears the earphone 100, the holding component may contact the second side of the ear, and the connecting component may connect the hook-shaped component and the holding component. The connecting component may extend from the first side of the ear to the second side of the ear, and the connecting component may cooperate with the hook-shaped component to provide the holding component with a pressing force on the second side of the ear. The connecting component may cooperate with the holding component to provide the hook-shaped component with a pressing force on the first side of the ear, so that the earphone 100 may be clamped near the user's ear by the fixing structure 110, and the stability of the earphone 100 in wearing may be ensured.

In some embodiments, a part of the hook-shaped component 111 and/or the body part 112 (the connecting component and/or the holding component) that contacts the user's ear may be made of a relatively soft material, a relatively hard material, or the like, or any combination thereof. The relatively soft material may refer to a material whose hardness (e.g., a Shore hardness) is less than a first hardness threshold (e.g., 15 A, 20 A, 30 A, 35 A, 40 A, etc.). For example, a relatively soft material may have a Shore hardness of 45 A-85 A, 30 D-60 D. The relatively hard material may refer to a material whose hardness (e.g., a Shore hardness) is greater than a second hardness threshold (e.g., 65 D, 70 D, 80 D, 85 D, 90 D, etc.). The relatively soft material may include, but is not limited to, polyurethanes (PU) (e.g., thermoplastic polyurethanes (TPU)), polycarbonate (PC), polyamides (PA), acrylonitrile butadiene styrene (ABS), polystyrene (PS), high impact polystyrene (HIPS), polypropylene(PP), polyethylene terephthalate (PET), polyvinyl chloride (PVC), polyurethanes (PU), polyethylene (PE), phenol formaldehyde (PF), urea-formaldehyde (UF), melamine-formaldehyde (MF), silica gel, or the like, or any combination thereof. The relatively hard material may include, but is not limited to, poly (ester sulfones) (PES), polyvinylidene chloride (PVDC), polymethyl methacrylate (PMMA), poly-ether-ether-ketone (Peek), or the like, or any combination thereof, or a mixture thereof with a reinforcing agent such as a glass fiber, a carbon fiber, etc. In some embodiments, the material of the part of the hook-shaped component 111 and/or the body part 112 of the fixing structure 110 that contacts the user's ear may be chosen according to a specific condition. In some embodiments, the relatively soft material may improve the comfort of the user wearing the earphone 100. The relatively hard material may enhance strength of the earphone 100. By reasonably configuring the materials of each component of the earphone 100, the strength of the earphone 100 may be enhanced while the comfort of the user is improved.

The first microphone array 120 located in the body part 112 (such as the connecting component and the holding component) of the fixing structure 110 may be configured to pick up environmental noise. In some embodiments, the environmental noise may refer to a combination of a plurality of external sounds in an environment where the user is located. In some embodiments, by installing the first microphone array 120 in the body part 112 of the fixing structure 110, the first microphone array 120 may be located near the user's ear canal. Based on the environmental noise obtained in this way, the processor 130 may more accurately calculate the noise that is actually transmitted to the user's ear canal, which may be more conducive to subsequent active noise reduction of the environmental noise heard by the user.

In some embodiments, the environmental noise may include the user's speech. For example, the first microphone array 120 may pick up the environmental noise according to a working state of the earphone 100. The working state of the earphone 100 may refer to a usage state used when the user wears the earphone 100. Merely by way of example, the working state of the earphone 100 may include, but is not limited to, a calling state, a non-calling state (e.g., a music playing state), a state of sending a voice message, etc. When the earphone 100 is in the non-calling state, a sound generated by the user's own speech may be regarded as the environmental noise. The first microphone array 120 may pick up the sound generated by the user's own speech and other environmental noises. When the earphone 100 is in the calling state, the sound generated by the user's own speech may not be regarded as the environmental noise. The first microphone array 120 may pick up the environmental noise other than the sound generated by the user's own speech. For example, the first microphone array 120 may pick up the noise emitted by a noise source located at a distance (e.g., 0.5 m, 1 m) away from the first microphone array 120.

In some embodiments, the first microphone array 120 may include one or more air conduction microphones. For example, when the user listens to a music using the earphone 100, the air conduction microphone(s) may simultaneously obtain the external environmental noise and the sound generated by the user's speech, and designate the obtained external environmental noise and the sound generated by the user's speech as the environmental noise. In some embodiments, the first microphone array 120 may also include one or more bone conduction microphones. A bone conduction microphone may be in direct contact with the user's skin. When the user speaks, a vibration signal generated by bones or muscles may be directly transmitted to the bone conduction microphone, and the bone conduction microphone may convert the vibration signal into an electrical signal and transmit the electrical signal to the processor 130 for processing. In some embodiments, the bone conduction microphone may also not be in direct contact with the human body. When the user speaks, the vibration signal generated by bones or muscles may be transmitted to the fixing structure 110 of the earphone 100 first, and then transmitted to the bone conduction microphone by the fixing structure 110. In some embodiments, when the user is in the calling state, the processor 130 may determine the sound signal collected by the air conduction microphone as the environmental noise and perform the noise reduction on the environmental noise. The sound signal collected by the bone conduction microphone may be transmitted to a terminal device as a voice signal, so as to ensure speech quality of the user during the call.

In some embodiments, the processor 130 may control on/off states of the bone conduction microphone and the air conduction microphone based on the working state of the earphone 100. In some embodiments, when the first microphone array 120 picks up the environmental noise, the on/off states of the bone conduction microphone and the air conduction microphone in the first microphone array 120 may be determined according to the working state of the earphone 100. For example, when the user wears the earphone 100 to play music, the bone conduction microphone may be in a standby state, and the air conduction microphone may be in the working state. As another example, when the user wears the earphone 100 to send a voice message, the bone conduction microphone may be in the working state, and the air conduction microphone may be in the working state. In some embodiments, the processor 130 may control the on/off state of the microphones (e.g., the bone conduction microphone, the air conduction microphone) in the first microphone array 120 by sending a control signal.

In some embodiments, according to a working principle of the microphone, the first microphone array 120 may include a moving-coil microphone, a ribbon microphone, a condenser microphone, an electret microphone, an electromagnetic microphone, a carbon particle microphone, or the like, or any combination thereof. In some embodiments, an arrangement of the first microphone array 120 may include a linear array (e.g., a straight line, a curve), a planar array (e.g., a regular and/or irregular shape such as a cross, a circle, a ring, a polygon, a mesh, etc.), a three-dimensional array (e.g., a cylinder, a sphere, a hemisphere, a polyhedron, etc.), or the like, or any combination thereof.

The processor 130 may be located in the hook-shaped component 111 or the body part 112 of the fixing structure 110, and the processor 130 may estimate a sound field at a target spatial position using the first microphone array 120. The sound field at the target spatial position may refer to distribution and changes (e.g., changes with time, changes with positions) of sound waves at or near the target spatial position. A physical quantity describing the sound field may include a sound pressure level, a sound frequency, a sound amplitude, a sound phase, a sound source vibration velocity, a medium (e.g., air) density, etc. Generally, these physical quantities may be functions of position and time. The target spatial position may refer to a spatial position close to the user's ear canal at a specific distance. The specific distance herein may be a fixed distance, such as 2 mm, 5 mm, 10 mm, etc. The target spatial position may be closer to the user's ear canal than any microphone in the first microphone array 120. In some embodiments, the target spatial position may be related to a count of microphones in the first microphone array 120 and their distribution positions relative to the user's ear canal. By adjusting the count of the microphones in the first microphone array 120 and/or the distribution positions relative to the user's ear canal, the target spatial position may be adjusted. For example, the target spatial position may be made closer to the user's ear canal by increasing the count of the microphones in the first microphone array 120. As another example, the target spatial position may be made closer to the user's ear canal by reducing a distance between the microphones in the first microphone array 120. As yet another example, the target spatial position may be made closer to the user's ear canal by changing the arrangement of the microphones in the first microphone array 120.

In some embodiments, the processor 130 may be further configured to generate, based on the estimated sound field at the target spatial position, a noise reduction signal. Specifically, the processor 130 may receive and process the environmental noise obtained by the first microphone array 120 to obtain parameters of the environmental noise (e.g., an amplitude, a phase, etc.), and estimate the sound field at the target spatial position based on the parameters of the environmental noise. Further, the processor 130 may generate, based on the estimated sound field at the target spatial position, the noise reduction signal. The parameters of the noise reduction signal (e.g., the amplitude, the phase, etc.) may be related to the environmental noise at the target spatial position. Merely by way of example, the amplitude of the noise reduction signal may be similar to an amplitude of the environmental noise at the target spatial position. The phase of the noise reduction signal may be approximately opposite to a phase of the environmental noise at the target spatial position.

In some embodiments, the processor 130 may include a hardware module and a software module. Merely by way of example, the hardware module may include, but is not limited to a digital signal processor (DSP), an advanced RISC machine (ARM), a central processing unit (CPU), an application specific integrated circuits (ASIC), a physics processing unit (PPU), a digital signal processor (DSP), a field programmable gate array (FPGA), a programmable logic device (PLD), a controller, a microprocessor, or the like, or any combination thereof. The software module may include an algorithm module.

The speaker 140 may be located in the holding component of the fixing structure 110. When the user wears the earphone 100, the speaker 140 is located near the user's ear. The speaker 140 may output a target signal according to the noise reduction signal. The target signal may be transmitted to the user's ear through the sound outlet hole of holding component to reduce or eliminate the environmental noise transmitted to the user's ear canal. In some embodiments, according to a working principle of a speaker, the speaker 140 may include an electrodynamic speaker (e.g., a moving-coil speaker), a magnetic speaker, an ion speaker, an electrostatic speaker (or a condenser speaker), a piezoelectric speaker, or the like, or any combination thereof. In some embodiments, according to a transmission mode of sound output by the speaker, the speaker 140 may include an air conduction speaker and a bone conduction speaker. In some embodiments, a count of the speakers 140 may be one or more. When the count of the speakers 140 is one, the speaker may output the target signal to eliminate the environmental noise, and simultaneously deliver effective sound information (e.g., an audio from a media device, an audio of a remote device for calling) to the user. For example, when the count of the speakers 140 is one and the speaker is the air conduction speaker, the air conduction speaker may be configured to output the target signal to eliminate the environmental noise. In this case, the target signal may be a sound wave (i.e., air vibration). The sound wave may be transmitted through the air to the target spatial position, and the sound wave and the environmental noise may cancel each other out at the target spatial position. At the same time, the sound wave output by the air conduction speaker may also include effective sound information. As another example, when the count of the speakers 140 is one and the speaker is a bone conduction speaker, the bone conduction speaker may be configured to output the target signal to eliminate the environmental noise. In this case, the target signal may be a vibration signal. The vibration signal may be transmitted to the user's basilar membrane through bones or tissues, and the target signal and the environmental noise may cancel each other out at the user's basilar membrane. At the same time, the vibration signal output by the bone conduction speaker may also include effective sound information. In some embodiments, when the count of the speakers 140 is more than one. A portion of the plurality of the speakers 140 may be configured to output the target signal to eliminate the environmental noise, and the other portion of the plurality of the speakers 140 may be configured to deliver effective sound information (e.g., an audio from a media device, an audio of a remote device for calling) to the user. In some embodiments, when the count of the speakers 140 is more than one and the plurality of speakers include a conduction speaker and an air conduction speaker. The air conduction speaker may be configured to output the sound wave to reduce or eliminate the environmental noise, and the bone conduction speaker may be configured to deliver the effective sound information to the user. Compared with the air conduction speaker, the bone conduction speaker may transmit mechanical vibration directly to the user's auditory nerve through the user's body (such as bones, skin tissue, etc.). In this process, the bone conduction speaker may have relatively little interference to the air conduction microphone that picks up the environmental noise.

In some embodiments, the speaker 340 and the first microphone array 120 may be located in the body part 112 of the earphone 300. The target signal output by the speaker 340 may also be picked up by the first microphone array 120, and the target signal may be not expected to be picked up, that is, the target signal should not be regarded as a part of the environmental noise. In this case, in order to reduce influence of the target signal output by the speaker 340 on the first microphone array 120, the first microphone array 120 may be disposed in a first target region. The first target region may be a region where an intensity of sound emitted by the speaker 340 is low or even the smallest in space. For example, the first target region may be an acoustic zero point position of a radiated sound field of an acoustic dipole formed by the earphone 100 (e.g., the sound outlet hole, the pressure relief hole), or a position within a certain distance threshold range from the acoustic zero position.

It should be noted that the above description of FIG. 1 is merely provided for the purpose of the illustration, and is not intended to limit the scope of the present disclosure. For persons having ordinary skills in the art, a plurality of variations and modifications may be made under the teachings of the present disclosure. For example, the fixing structure 110 of the earphone 100 may be replaced with a housing structure. The housing structure may have a shape suitable for the human ear (e.g., a C-shape, a semicircle shape, etc.), so that the earphone 100 may be hung near the user's ear. In some embodiments, a component in the earphone 100 may be divided into a plurality of sub-components, or a plurality of components may be merged into a single component. Those variations and modifications do not depart from the scope of the present disclosure.

Figure 2:
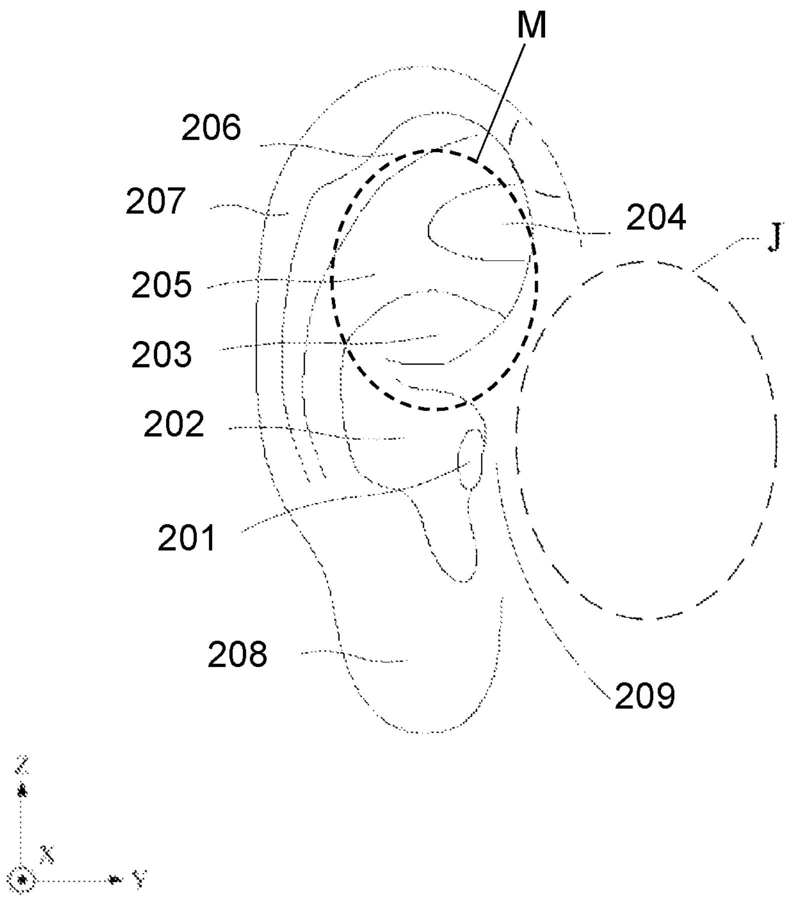
FIG. 2 is a schematic diagram illustrating an exemplary ear according to some embodiments of the present disclosure.

FIG. 2 is a schematic diagram illustrating an exemplary ear according to some embodiments of the present disclosure.

As shown in FIG. 2, the ear 200 may include an external ear canal 201, a concha cavity 202, a cymba conchae 203, a triangular fossa 204, an antihelix 205, a scapha 206, a helix 207, an earlobe 208, and a helix feet 209. In some embodiments, the wearing and stability of an earphone (e.g., the earphone 100) may be achieved by means of one or more parts of the ear 200. In some embodiments, parts of the ear 200, such as the external ear canal 201, the concha cavity 202, the cymba conchae 203, the triangular fossa 204, etc., may be used to meet the wearing requirements of earphones because they have a certain depth and volume in a three-dimensional space. In some embodiments, an open earphone (e.g., the earphone 100) may be worn by means of parts of the ear 200, such as the cymba conchae 203, the triangular fossa 204, the antihelix 205, the scapha 206, or the like, or any combination thereof. In some embodiments, in order to improve the wearing comfort and reliability of the earphone, the earlobe 208 of the user and other parts may also be further used. By using other parts other than the external ear canal 201 of the ear 200, the wearing of the earphone and the transmission of mechanical vibrations may be achieved, and the external ear canal 201 of the user may be "liberated," thereby reducing the impact of the earphone on the health of the user's ear. When the user wears the earphone while walking on a road, the earphone may not block the user's external ear canal 201. The user may receive both sounds from the earphone and sounds from an environment (e.g., a sound of horn, a car bell, a sound of the surrounding people, a sound of a traffic command, etc.), thereby reducing a probability of a traffic accident. For example, when the user wears the earphone, a whole or part of the structure of the earphone may be located on the front side of the helix feet 209 (e.g., a region J enclosed by a dotted line in FIG. 2). As another example, when the user wears the earphone, the whole or part of the structure of the earphone may be in contact with an upper part of the external ear canal 201 (e.g., positions where one or more parts of the helix feet 209, the cymba conchae 203, the triangular fossa 204, the antihelix 205, the scapha 206, the helix 207, etc. are located). As yet another example, when the user wears the earphone, the whole or part of the structure of the earphone may be located in one or more parts (e.g., the concha cavity 202, the cymba conchae 203, the triangular fossa 204, etc.) of the ear (e.g., a region M enclosed by a dotted line in FIG. 2).

The above description of the ear 200 is merely provided for the purpose of illustration, and is not intended to limit the scope of the present disclosure. For persons having ordinary skills in the art, a plurality of variations and modifications may be made under the teachings of the present disclosure. For example, for different users, structures, shapes, sizes, thicknesses, etc., of the one or more parts of the ear 200 may be different. As another example, a part of the structure of the earphone may shield part or all of the external ear canal 201. Those variations and modifications do not depart from the scope of the present disclosure.

Figure 3:
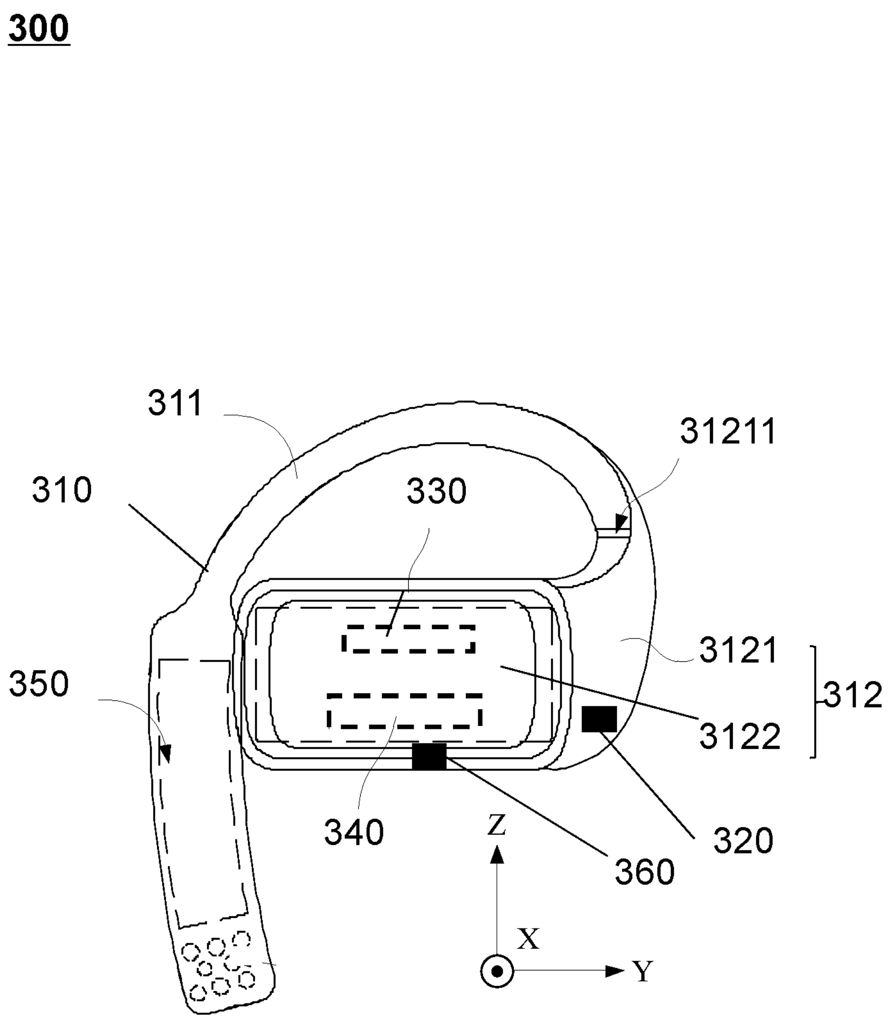
FIG. 3 is a schematic structural diagram illustrating an exemplary earphone according to some embodiments of the present disclosure.
Figure 4:
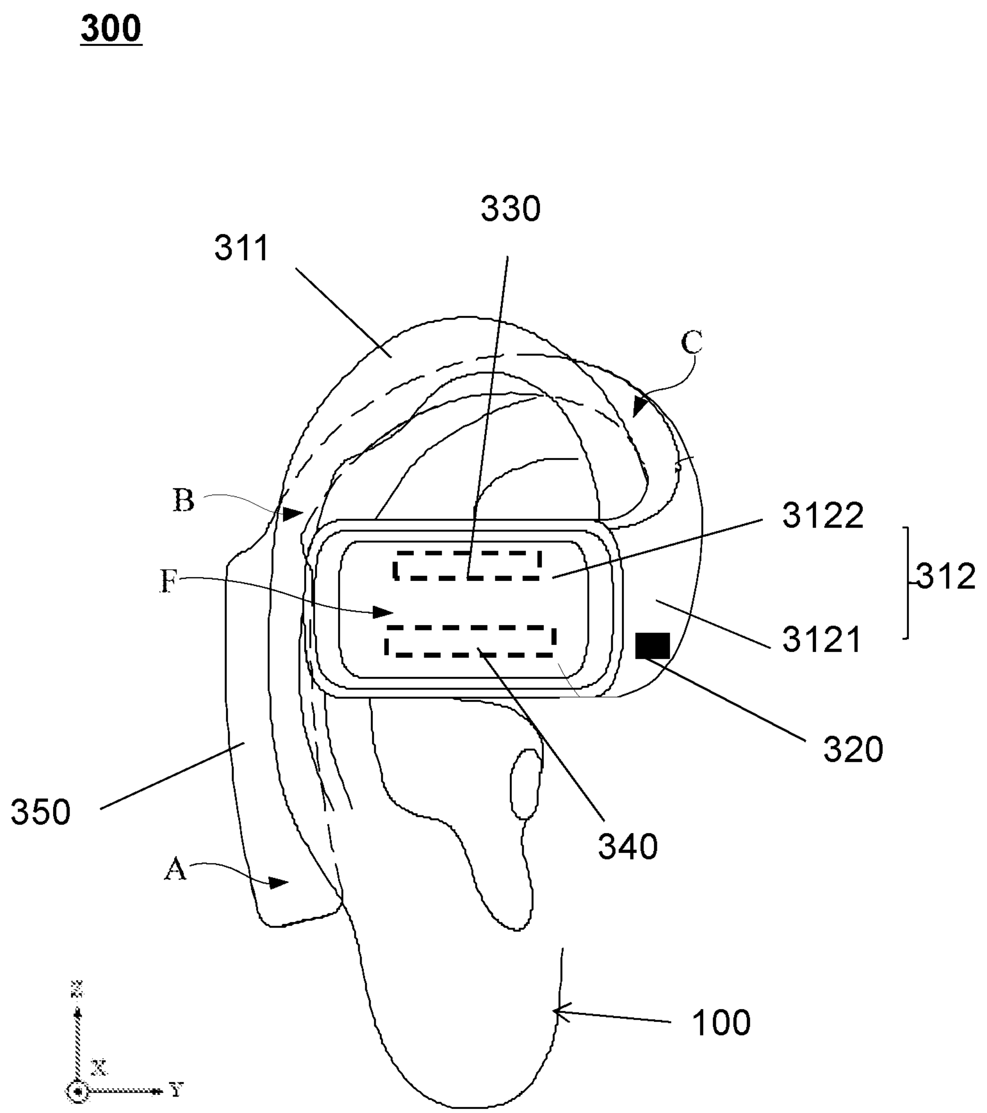
FIG. 4 is a schematic diagram illustrating an exemplary earphone in a wearing state according to some embodiments of the present disclosure.

FIG. 3 is a schematic structural diagram illustrating an exemplary earphone according to some embodiments of the present disclosure. FIG. 4 is a schematic diagram illustrating an exemplary earphone in a wearing state according to some embodiments of the present disclosure.

As shown in FIG. 3 and FIG. 4, the earphone 300 may include a fixing structure 310, a first microphone array 320, a processor 330, and a speaker 340. The first microphone array 320, the processor 330, and the speaker 340 may be located in the fixing structure 310. In some embodiments, the fixing structure 310 may be configured to hang the earphone 300 near a user's ear without blocking an ear canal of the user. In some embodiments, the fixing structure 310 may include a hook-shaped component 311 and a body part 312. In some embodiments, the hook-shaped component 311 may include any shape suitable for the user to wear, such as a C shape, a hook shape, etc. When the user wears the earphone 300, the hook-shaped component 311 may be hung between a first side of the ear and the head of the user. In some embodiments, the body part 312 may include a connecting component 3121 and a holding component 3122. The connecting component 3121 may be configured to connect the hook-shaped component 311 and the holding component 3122. When the user wears the earphone 300, the holding component 3121 may contact a second side of the ear. The connecting component 3121 may extend from the first side of the ear to the second side of the ear. Both ends of the connecting component 3121 may be respectively connected to the hook-shaped component 311 and the holding component 3122. The connecting component 3121 may cooperate with the hook-shaped component 311 to provide the holding component 3121 with a pressing force on the second side of the ear. The connecting component 3121 may cooperate with the holding component 3122 to provide the hook-shaped component 311 with a pressing force on the first side of the ear.

In some embodiments, when the earphone 300 is in a non-wearing state (i.e., a natural state), the connecting component 3121 may connect the hook-shaped component 311 and the holding component 3122, so that the fixing structure 310 may be curved in a three-dimensional space. It may also be understood that in the three-dimensional space, the hook-shaped component 311, the connecting component 3121, and the holding component 3122 may be not coplanar. In this arrangement, when the earphone 300 is in a wearing state, as shown in FIG. 4, the hook-shaped component 311 may be hung between the first side of the ear 100 and the head of the user, and the holding component 3122 may contact the second side of the user's ear 100, so that the holding component 3122 and the hook-shaped component 311 may cooperate to clamp the ear. In some embodiments, the connecting component 3121 may extend from the head to outside of the head (i.e., from the first side of the ear 100 to the second side of the ear), and then cooperate with the hook-shaped component 311 to provide the holding component 3122 with a pressing force on the second side of the ear 100. At the same time, according to interaction of forces, when extending from the head to outside of the head, the connecting component 3121 may also cooperate with the holding component 3122 to provide the hook-shaped component 311 with a pressing force on the first side of the ear 100, so that the fixing structure 310 may clamp the user's ear 100 to realize the wearing of the earphone 300.

In some embodiments, the holding component 3122 may press against the ear under the action of the pressing force, for example, against a region where parts of the cymba conchae, the triangular fossa, the antihelix, etc., are located, so that the earphone 300 may not block the external ear canal of the ear when the earphone 300 is in the wearing state. Merely by way of example, when the earphone 300 is in the wearing state, a projection of the holding component 3122 on the user's ear may fall within a range of the helix of the ear. Further, the holding component 3122 may be located at the side of the external ear canal of the ear close to a top of the user's head, and contact the helix and/or the antihelix. In this arrangement, on one hand, the holding component 3122 may be prevented from shielding the external ear canal, thereby not blocking the user's ear. At the same time, a contact area between the holding component 3122 and the ear may also be increased, thereby improving the wearing comfort of the earphone 300. On the other hand, when the holding component 3122 is located at the side of the external ear canal of the ear close to the top of the user's head, the speaker 340 located at the holding component 3122 may be enabled to be closer to the user's ear canal, thereby improving the user's listening experience when using the earphone 300.

In some embodiments, in order to improve the stability and comfort of the user wearing the earphone 300, the earphone 300 may also elastically clamp the ear. For example, in some embodiments, the hook-shaped component 311 of the earphone 300 may include an elastic component (not shown) connected to the connecting component 3121. The elastic component may have a certain elastic deformation capability, so that the hook-shaped component 311 may be deformed under the action of an external force, thereby generating a displacement relative to the holding component 3122 to allow the hook-shaped component 311 to cooperate with the holding component 3122 to elastically clamp the ear. Specifically, in the process of wearing the earphone 300, the user may first force the hook-shaped component 311 to deviate from the holding component 3122, so that the ear may protrude between the holding component 3122 and the hook-shaped component 311. After a wearing position is appropriate, a hand may be released to allow the earphone 300 to elastically clamp the ear. The user may further adjust the position of the earphone 300 on the ear according to an actual wearing situation.

In some embodiments, different users may have great differences in age, gender, expression of traits controlled by genes, etc., resulting in different sizes and shapes of ears and heads of the different users. Therefore, in some embodiments, the hook-shaped component 311 may be configured to be rotatable relative to the connecting component 3121, the holding component 3122 may be configured to be rotatable relative to the connecting component 3121, or a portion of the connecting component 3121 may be configured to be rotatable relative to the other portion, so that a relative position relationship of the hook-shaped component 311, the connecting component 3121, and the holding component 3122 in the three-dimensional space may be adjusted, so that the earphone 300 can adapt to different users, that is, to increase an applicable scope of the earphone 300 for the users in terms of wearing. Meanwhile, the relative position relationship of the hook-shaped component 311, the connecting component 3121, and the holding component 3122 in the three-dimensional space may be adjustable, and positions of the first microphone array 320 and the speaker 340 relative to the user's ear (e.g., the external ear canal) may also be adjusted, thereby improving the effect of active noise reduction of the earphone 300. In some embodiments, the connecting component 3121 may be made of deformable material such as soft steel wires, etc. The user may bend the connecting component 3121 to rotate one portion relative to the other portion, so as to adjust the relative positions of the hook-shaped component 311, the connecting component 3121, and the holding component 3122 in the three-dimensional space, thereby meeting the wearing requirements of the user. In some embodiments, the connecting component 3121 may also be provided with a rotating shaft mechanism 31211, through which the user may adjust the relative positions of the hook-shaped component 311, the connecting component 3121, and the holding component 3122 in the three-dimensional space to meet the wearing requirements of the user.

It should be noted that considering the stability and comfort of the earphone 300 in wearing, multiple variations and modifications may be made to the earphone 300 (the fixing structure 310). More descriptions regarding the earphone 300 may be found in the relevant application with Application No. PCT/CN2021/109154, the entire contents of which are hereby incorporated by reference.

In some embodiments, the earphone 300 may estimate a sound field at the user's ear canal (e.g., a target spatial position) using the first microphone array 320 and the processor 330, and output a target signal using the speaker 340 to reduce environmental noise at the user's ear canal, thereby achieving active noise reduction of the earphone 300. In some embodiments, the first microphone array 320 may be located in the body part 312 of the fixing structure 310, so that when the user wears the earphone 300, the first microphone array 320 may be located near the user's ear canal. The first microphone array 320 may pick up the environmental noise near the user's ear canal. The processor 330 may further estimate the environmental noise at the target spatial position according to the environmental noise near the user's ear canal, for example, the environmental noise at the user's ear canal. In some embodiments, the target signal output by the speaker 340 may also be picked up by the first microphone array 320. In order to reduce the impact of the target signal output by the speaker 340 on the environmental noise picked up by the first microphone array 320, the first microphone array 320 may be located in a region where an intensity of sound emitted by the speaker 340 is small or even the smallest in space, for example, an acoustic zero point position of a radiated sound field of an acoustic dipole formed by the earphone 300 (e.g. a sound outlet hole and a pressure relief hole). Detailed descriptions regarding the position of the first microphone array 320 may be found elsewhere (e.g., FIGS. 10-13 and relevant descriptions thereof) in the present disclosure.

In some embodiments, the processor 330 may be located in the hook-shaped component 311 or the body part 312 of the fixing structure 310. The processor 330 may be electrically connected to the first microphone array 320. The processor 330 may estimate the sound field at the target spatial position based on the environmental noise picked up by the first microphone array 320, and generate a noise reduction signal based on the estimated sound field at the target spatial position. Detailed descriptions regarding the processor 330 estimating the sound field at the target spatial position using the first microphone array 320 may be found elsewhere (e.g., FIGS. 14-16, and relevant descriptions thereof) in the present disclosure.

In some embodiments, the processor 330 may also be configured to control sound producing of the speaker 340. The processor 330 may control the sound producing of the speaker 340 according to an instruction input by the user. Alternatively, the processor 330 may generate the instruction to control the speaker 340 according to information of one or more components of the earphone 300. In some embodiments, the processor 330 may control other components of the earphone 300 (e.g., a battery). In some embodiments, the processor 330 may be disposed at any part of the fixing structure 310. For example, the processor 330 may be disposed at the holding component 3122. In this case, a wiring distance between the processor 330 and other components (e.g., the speaker 340, a button switch, etc.) disposed at the holding component 3122 may be shortened, so as to reduce signal interference between the wirings and reduce a possibility of a short circuit between the wirings.

In some embodiments, the speaker 340 may be located in the holding component 3122 of the body part 312, so that when the user wears the earphone 300, the speaker 340 may be located near the user's ear canal. The speaker 340 may output, based on the noise reduction signal generated by the processor 330, the target signal. The target signal may be transmitted to the outside of the earphone 300 through a sound outlet hole (not shown) on the holding component 3122, which may be configured to reduce the environmental noise at the user's ear canal. The sound outlet hole on the holding component 3122 may be located on a side of the holding component 3122 facing the user's ear, so that the sound outlet hole may be close enough to the user's ear canal, and the sound emitted by the sound outlet hole may be better heard by the user.

In some embodiments, the earphone 300 may also include a component such as a battery 350, etc. The battery 350 may provide power for other components of the earphone 300 (e.g., the first microphone array 320, the speaker 340, etc.). In some embodiments, any two of the first microphone array 320, the processor 330, the speaker 340, and the battery 350 may communicate in various ways, such as a wired connection, a wireless connection, or the like, or any combination thereof. In some embodiments, the wired connection may include metal cables, optical cables, hybrid metal and optical cables, etc. The examples described above are merely for convenience of illustration. A medium of the wired connection may also be other types of transmission carriers, such as an electrical signal, an optical signal, etc. The wireless connection may include radio communication, free space light communication, acoustic communication, electromagnetic induction, etc.

In some embodiments, the battery 350 may be disposed at one end of the hook-shaped component 311 away from the connecting component 3121, and located between a rear side of the user's ear and the head when the user wears the earphone 300. In this arrangement, a capacity of the battery 350 may be increased and the battery life of the earphone 300 may be improved. Moreover, a weight of the earphone 300 may be balanced to overcome a self-weight of structures such as the holding component 3122 and the internal processor 330, the speaker 340, thereby improving the stability and comfort of the earphone 300 in wearing. In some embodiments, the battery 350 may also transmit its own state information to the processor 330 and receive an instruction of the processor 330 to perform a corresponding operation. The state information of the battery 350 may include an on/off state, a remaining power, a remaining power usage time, a charging time, or the like, or any combination thereof.

One or more coordinate systems may be established in the present disclosure for the convenience of describing a relationship between various parts of an earphone (e.g., the earphone 300) and a relationship between the earphone and the user. In some embodiments, similar to a medical field, three basic planes of a sagittal plane, a coronal plane, and a horizontal plane, and three basic axes of a sagittal axis, a coronal axis, and a vertical axis of a human body may be defined. See the coordinate axis in FIGS. 2-4. As used herein, the sagittal plane may refer to a plane perpendicular to the ground along a front-rear direction of the body, which divides the human body into left and right parts. In the embodiments of the present disclosure, the sagittal plane may refer to a YZ plane, that is, an X axis may be perpendicular to the sagittal plane of the user. The coronal plane may refer to a plane perpendicular to the ground along a left-right direction of the body, which divides the human body into front and rear parts. In the embodiment of the present disclosure, the coronal plane may refer to an XZ plane, that is, a Y axis may be perpendicular to the coronal plane of the user. The horizontal plane may refer to the a plane parallel to the ground along an upper-lower direction of the body, which divides the human body into upper and lower parts. In the embodiment of the present disclosure, the horizontal plane may refer to an XY plane, that is, a Z axis may be perpendicular to the horizontal plane of the user. The sagittal axis may refer to an axis that vertically passes through the coronal plane along the front-rear direction of the body. In the embodiment of the present disclosure, the sagittal axis may refer to the Y-axis. The coronal axis may refer to an axis that vertically passes through the sagittal plane along the left-right direction of the body. In the embodiment of the present disclosure, the coronal axis may refer to the X axis. The vertical axis may refer to an axis that vertically passes through the horizontal plane along the upper-lower direction of the body. In the embodiments of the present disclosure, the vertical axis may refer to the Z axis.

Figure 5:
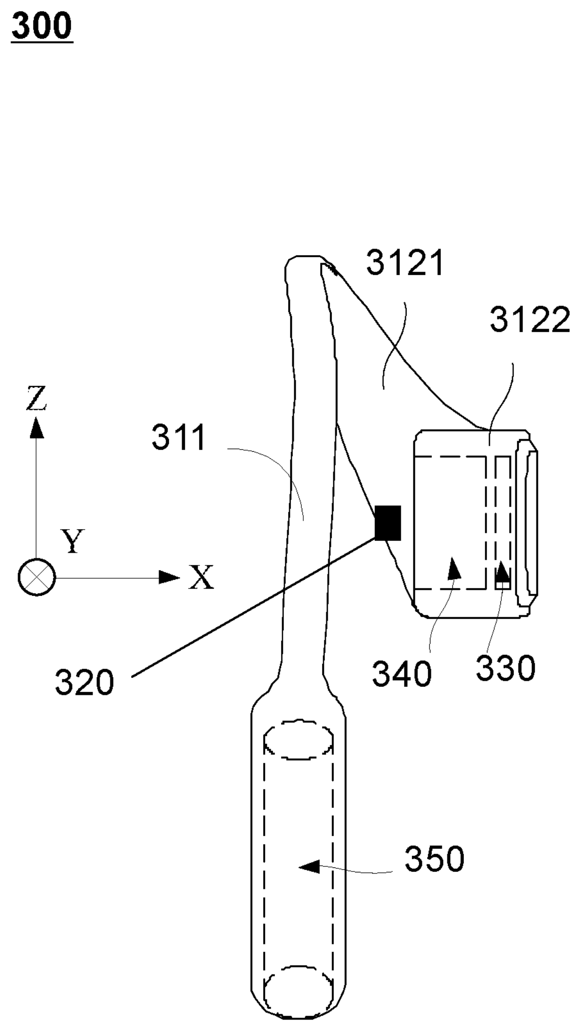
FIG. 5 is a schematic structural diagram illustrating an exemplary earphone according to some embodiments of the present disclosure.
Figure 6:
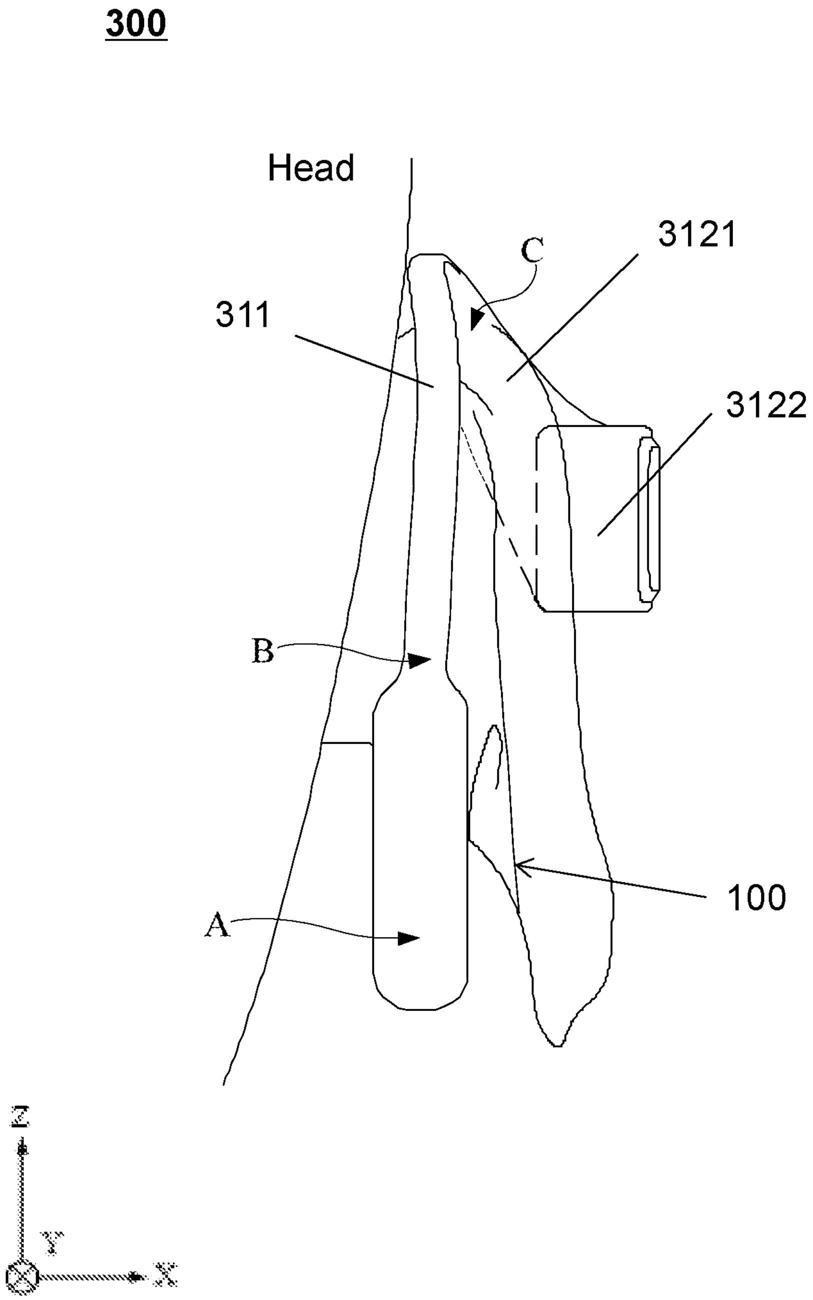
FIG. 6 is a schematic diagram illustrating an exemplary earphone in a wearing state according to some embodiments of the present disclosure.

FIG. 5 is a schematic structural diagram illustrating an exemplary earphone according to some embodiments of the present disclosure. FIG. 6 is a schematic diagram illustrating an exemplary earphone in a wearing state according to some embodiments of the present disclosure.

Referring to FIGS. 5-6, in some embodiments, the hook-shaped component 311 may be close to the holding component 3122, so that when the earphone 300 is in the wearing state as shown in FIG. 6, a free end of the hook-shaped component 311 facing away from the connecting component 3121 may act on a first side (rear side) of the ear 100 of a user.

In some embodiments, referring to FIGS. 4-6, the connecting component 3121 may be connected to the hook-shaped component 311. The connecting component 3121 and the hook-shaped component 311 may form a first connection point C. In a direction from the first connection point C between the hook-shaped component 311 and the connecting component 3121 to the free end of the hook-shaped component 311, the hook-shaped component 311 may be bent towards the rear side of the ear 100 and form a first contact point B with the rear side of the ear 100. The holding component 3122 may form a second contact point F with the second side (front side) of the ear 100. A distance between the first contact point B and the second contact point F along an extension direction of the connecting component 3121 in the natural state (that is, a non-wearing state) may be smaller than a distance between the first contact point B and the second contact point F along the extension direction of the connecting component 3121 in the wearing state, thereby providing the holding component 3122 with a pressing force on the second side (front side) of the ear 100, and providing the hook-shaped component 311 with a pressing force on the first side (rear side) of the ear 100. It can also be understood that in the natural state of the earphone 300, the distance between the first contact point B and the second contact point F along the extension direction of the connecting component 3121 is smaller than a thickness of the user's ear 100, so that the earphone 300 may be clamped to the user's ear 100 like a "clip" in the wearing state.

In some embodiments, the hook-shaped component 311 may also extend in a direction away from the connecting component 3121, that is, to extend an overall length of the hook-shaped component 311, so that when the earphone 300 is in the wearing state, the hook-shaped component 311 may also form a third contact point A with the rear side of the ear 100. The first contact point B may be located between the first connection point C and the third contact point A, and close to the first connection point C. A distance between projections of the first contact point B and the third contact point A on a reference plane (e.g., the YZ plane) perpendicular to an extension direction of the connecting component 3121 in the natural state may be smaller than a distance between projections of the first contact point B and the third contact point A on the reference plane (e.g., the YZ plane) perpendicular to an extension direction of the connecting component 3121 in the wearing state. In this arrangement, the free end of the hook-shaped component 311 may be pressed against the rear side of the user's ear 100, so that the third contact point A may be located in a region of the ear 100 close to the earlobe, and the hook-shaped component 311 may further clamp the user's ear in a vertical direction (Z-axis direction) to overcome a self-weight of the holding component 3122. In some embodiments, after the overall length of the hook-shaped component 311 is extended, a contact area between the hook-shaped component 311 and the user's ear 100 may be increased while the hook-shaped component 311 clamps the user's ear 100 in the vertical direction, that is, a friction force between the hook-shaped component 311 and the user's ear 100 may be increased, thereby improving the wearing stability of the earphone 300.

In some embodiments, a connecting component 3121 may be provided between the hook-shaped component 311 and the holding component 3122 of the earphone 300, so that when the earphone 300 is in the wearing state, the connecting component 3121 may cooperate with the hook-shaped component 311 to provide the holding component 3122 with a pressing force on the first side of the ear. Therefore, the earphone 300 may be firmly attached to the user's ear when the earphone 300 is in the wearing state, thereby improving the stability of the earphone 300 in wearing and the reliability of the earphone 300 in sound production.

Figure 7:
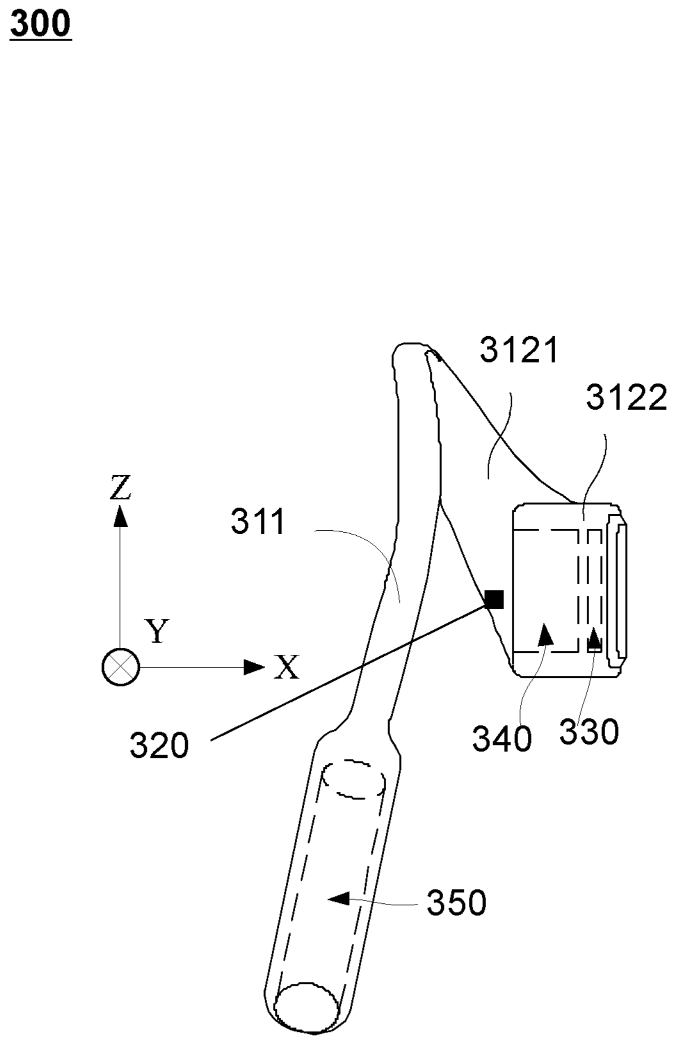
FIG. 7 is a structural diagram illustrating an exemplary earphone according to some embodiments of the present disclosure.
Figure 8:
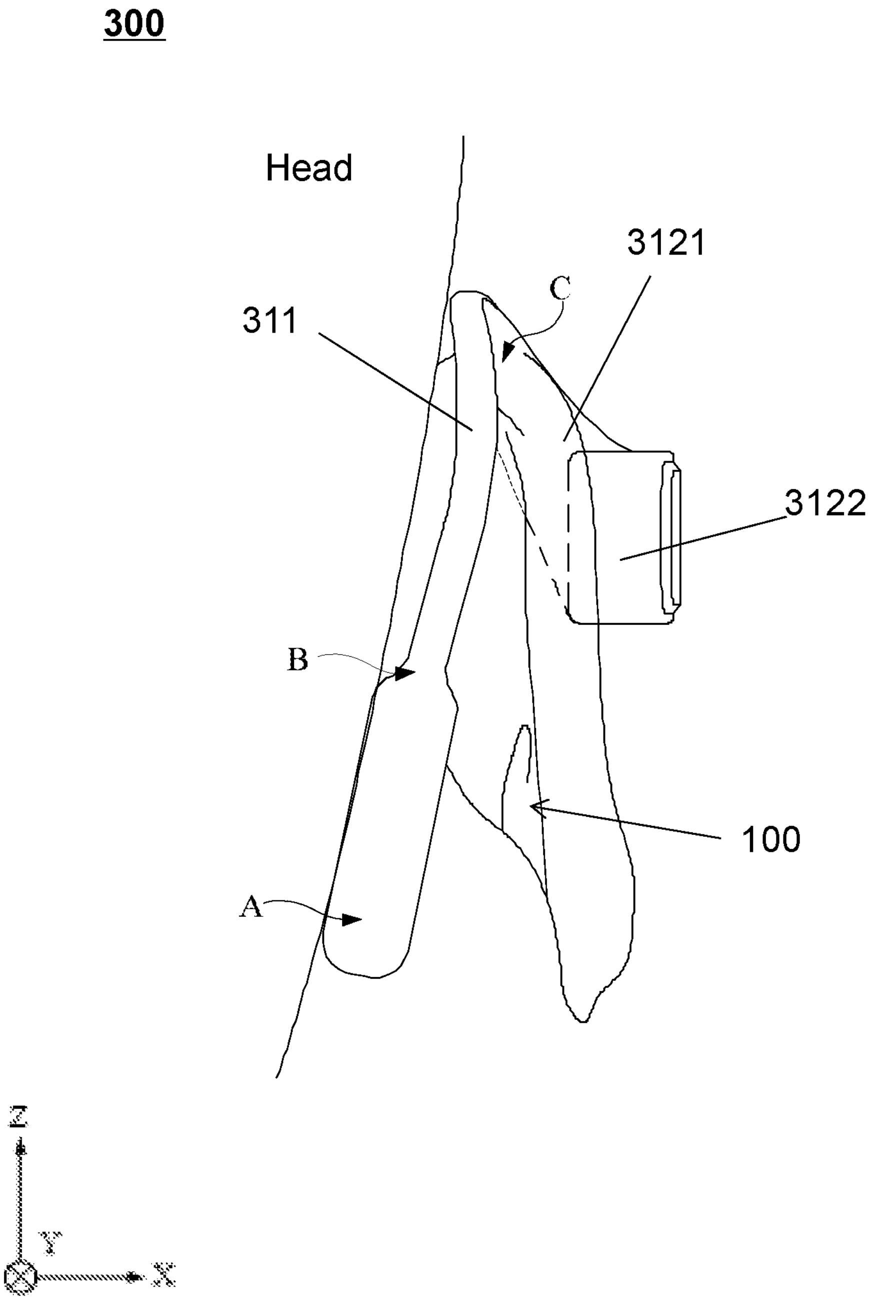
FIG. 8 is a schematic diagram illustrating an exemplary earphone in a wearing state according to some embodiments of the present disclosure.

FIG. 7 is a structural diagram illustrating an exemplary earphone according to some embodiments of the present disclosure. FIG. 8 is a schematic diagram illustrating an exemplary earphone in a wearing state according to some embodiments of the present disclosure.

In some embodiments, the earphone 300 shown in FIGS. 7-8 may be similar to the earphone 300 shown in FIGS. 5-6, and a difference may lie in that a bending direction of the hook-shaped component 311 is different. In some embodiments, referring to FIGS. 7-8, in the direction from the first connection point C between the hook-shaped component 311 and the connecting component 3121 to the free end of the hook-shaped component 311 (an end away from the connecting component 3121), the hook-shaped component 311 may be bent towards the user's head, and form the first contact point B and the third contact point A with the head. The first contact point B may be located between the third contact point A and the first connection point C. In this arrangement, the hook-shaped component 311 may form a lever structure with the first contact point B as a fulcrum. At this time, the free end of the hook-shaped component 311 may press against the user's head, and the user's head may provide a force directed towards outside of the head at the third contact point A. The force may be converted by the lever structure into a force directed at the head at the first connection point C, thereby providing the holding component 3122 with a pressing force on the first side of the ear 100 via the connecting component 3121.

In some embodiments, the magnitude of the force directed towards the outside of the user's head at the third contact point A may be positively related to the magnitude of an included angle formed by the free end of the hook-shaped component 311 and the YZ plane when the earphone 300 is in the non-wearing state. Specifically, the larger the included angle formed between the free end of the hook-shaped component 311 and the YZ plane when the earphone 300 is in the non-wearing state, the better the free end of the hook-shaped component 311 may press against the user's head when the earphone 300 is in the wearing state, and the greater the force that the user's head may provide at the third contact point A directed towards the outside of the head. In some embodiments, in order to enable the free end of the hook-shaped component 311 to press against the user's head when the earphone 300 is in the wearing state, and to enable the user's head to provide a force directed towards the outside of the head at the third contact point A, the included angle formed between the free end of the hook-shaped component 311 and the YZ plane when the earphone 300 is in the non-wearing state may be greater than the included angle formed between the free end of the hook-shaped component 311 and the YZ plane when the earphone 300 is in the wearing state.

In some embodiments, when the free end of the hook-shaped component 311 presses against the user's head, in addition to making the user's head provide a force directed towards the outside of the head at the third contact point A, another pressing force may be formed on at least the first side of the ear 100 by the hook-shaped component 311, and may cooperate with the pressing force formed by the holding component 3122 on the second side of the ear 100 to form a pressing effect of "front and rear clamping" on the user's ear 100, thereby improving the stability of the earphone 300 in wearing.

It should be noted that, during actual wearing, due to differences in physiological structures such as heads, ears, etc., of different users, the actual wearing of the earphone 300 may be affected to a certain extent, and a position of the contact point (e.g., the first contact point B, the second contact point F, the third contact point A, etc.) between the earphone 300 and the user's head or ear may change accordingly.

In some embodiments, when the speaker 340 is located in the holding component 3122, the actual wearing of the earphone 300 may be affected to a certain extent due to the differences in the physiological structures such as heads, ears, etc., of different users. Therefore, when different users wear the earphone 300, a relative position relationship of the speaker 340 and the user's ear may change. In some embodiments, by providing the structure of the holding component 3122, the position of the speaker 340 on the overall structure of the earphone 300 may be adjusted, thereby adjusting a distance of the speaker 340 relative to the user's ear canal.

Figure 9A:
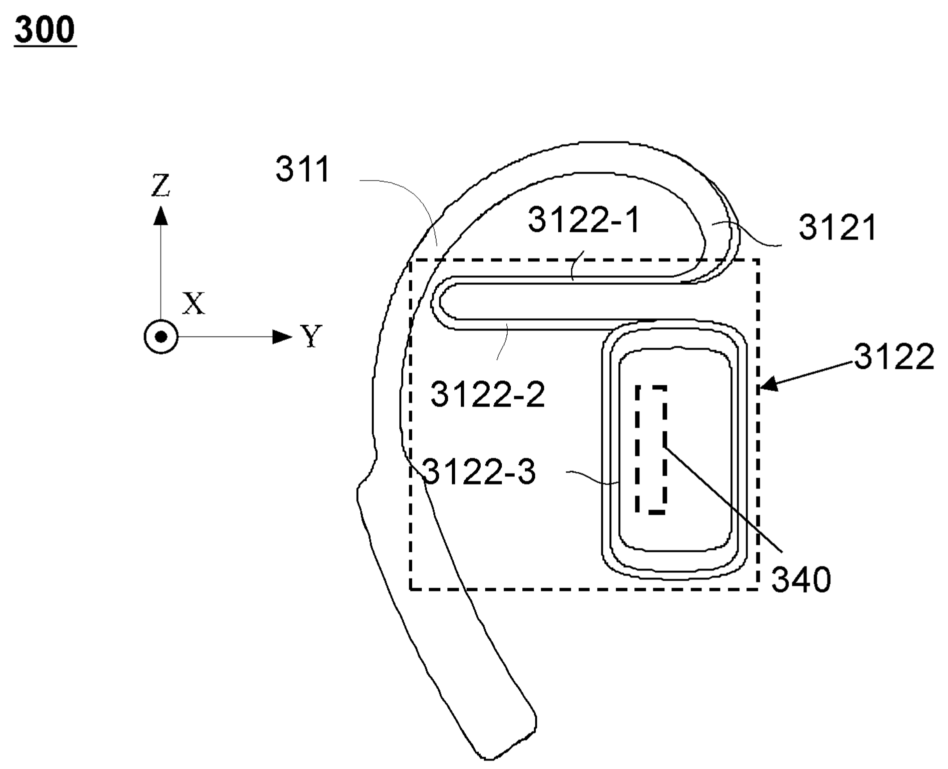
FIG. 9A is a structural diagram illustrating an exemplary earphone according to some embodiments of the present disclosure.
Figure 9B:
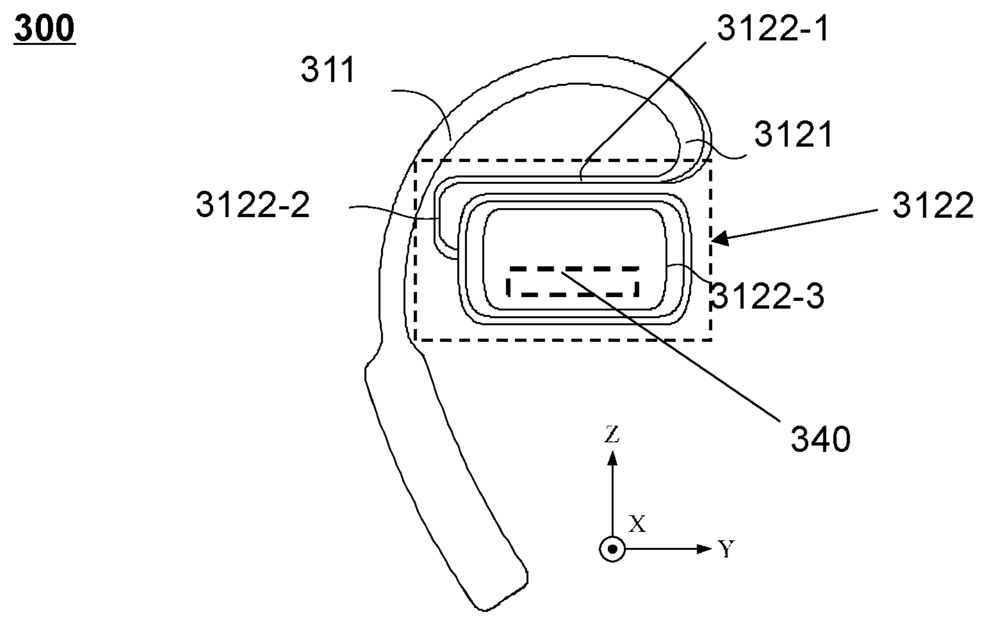
FIG. 9B is a structural diagram illustrating an exemplary earphone according to some embodiments of the present disclosure.

FIG. 9A is a structural diagram illustrating an exemplary earphone according to some embodiments of the present disclosure. FIG. 9B is a structural diagram illustrating an exemplary earphone according to some embodiments of the present disclosure.

Referring to FIGS. 9A-9B, the holding component 3122 may be designed as a multi-segment structure to adjust a relative position of the speaker 340 on the overall structure of the earphone 300. In some embodiments, the holding component 3122 may be a multi-segment structure, which may make the earphone 300 in the wearing state without blocking the external ear canal of the ear, and at the same time, may make the speaker 340 as close to the external ear canal as possible to improve the user's listening experience when using the earphone 300.

Referring to FIG. 9A, in some embodiments, the holding component 3122 may include a first holding segment 3122-1, a second holding segment 3122-2, and a third holding segment 3122-3 that are connected end to end in sequence. One end of the first holding segment 3122-1 facing away from the second holding section 3122-2 may be connected to the connecting component 3121, and the second holding segment 3122-2 may be folded back relative to the first holding segment 3122-1, so that the second holding segment 3122-2 and the first holding segment 3122-1 may have a distance. In some embodiments, the second holding segment 3122-2 and the first holding segment 3122-1 may have a U-shaped structure. The third holding segment 3122-3 may be connected to an end of the second holding segment 3122-2 facing away from the first holding segment 3122-1. The third holding segment 3122-3 may be configured to dispose a structural component such as the speaker 340, etc.

In some embodiments, referring to FIG. 9A, in this arrangement, a position of the third holding segment 3122-3 on the overall structure of the earphone 300 may be adjusted by adjusting the distance between the second holding segment 3122-2 and the first holding segment 3122-1, a folded back length of the second holding segment 3122-2 relative to the first holding segment 3122-1 (a length of the second holding segment 3122-2 along the Y-axis direction), etc., thereby adjusting a position or a distance of the speaker 340 located on the third holding segment 3122-3 relative to the user's ear canal. In some embodiments, the distance between the second holding segment 3122-2 and the first holding segment 3122-1, and the folded back length of the second holding segment 3122-2 relative to the first holding segment 3122-1 may be set according to ear characteristics (e.g., shape, size, etc.) of different users, which will not be limited specifically herein.

Referring to FIG. 9B, in some embodiments, the holding component 3122 may include the first holding segment 3122-1, the second holding segment 3122-2, and the third holding segment 3122-2 that are connected end to end in sequence. One end of the first holding segment 3122-1 facing away from the second holding segment 3122-2 may be connected to the connecting component 3121, and the second holding segment 3122-2 may be bent relative to the first holding segment 3122-1, so that the third holding segment 3122-3 and the first holding segment 3122-1 may have a distance. A structural component, such as the speaker 340, etc., may be disposed on the third holding segment 3122-3.

In some embodiments, referring to FIG. 9B, in this arrangement, a position of the third holding segment 3122-3 on the overall structure of the earphone 300 may be adjusted by adjusting the distance between the third holding segment 3122-3 and the first holding segment 3122-1, abending the length of the second holding segment 3122-2 relative to the first holding segment 3122-1 (a length of the second holding section 3122-2 along the Z-axis direction), etc., thereby adjusting a position or a distance of the speaker 340 located on the third holding segment 3122-3 relative to the user's ear canal. In some embodiments, the distance between the third holding segment 3122-3 and the first holding segment 3122-1, and the bending length of the second holding segment 3122-2 relative to the first holding segment 3122-1 may be set according to ear characteristics (e.g., shape, size, etc.) of different users, which will not be limited specifically herein.

Figure 10:
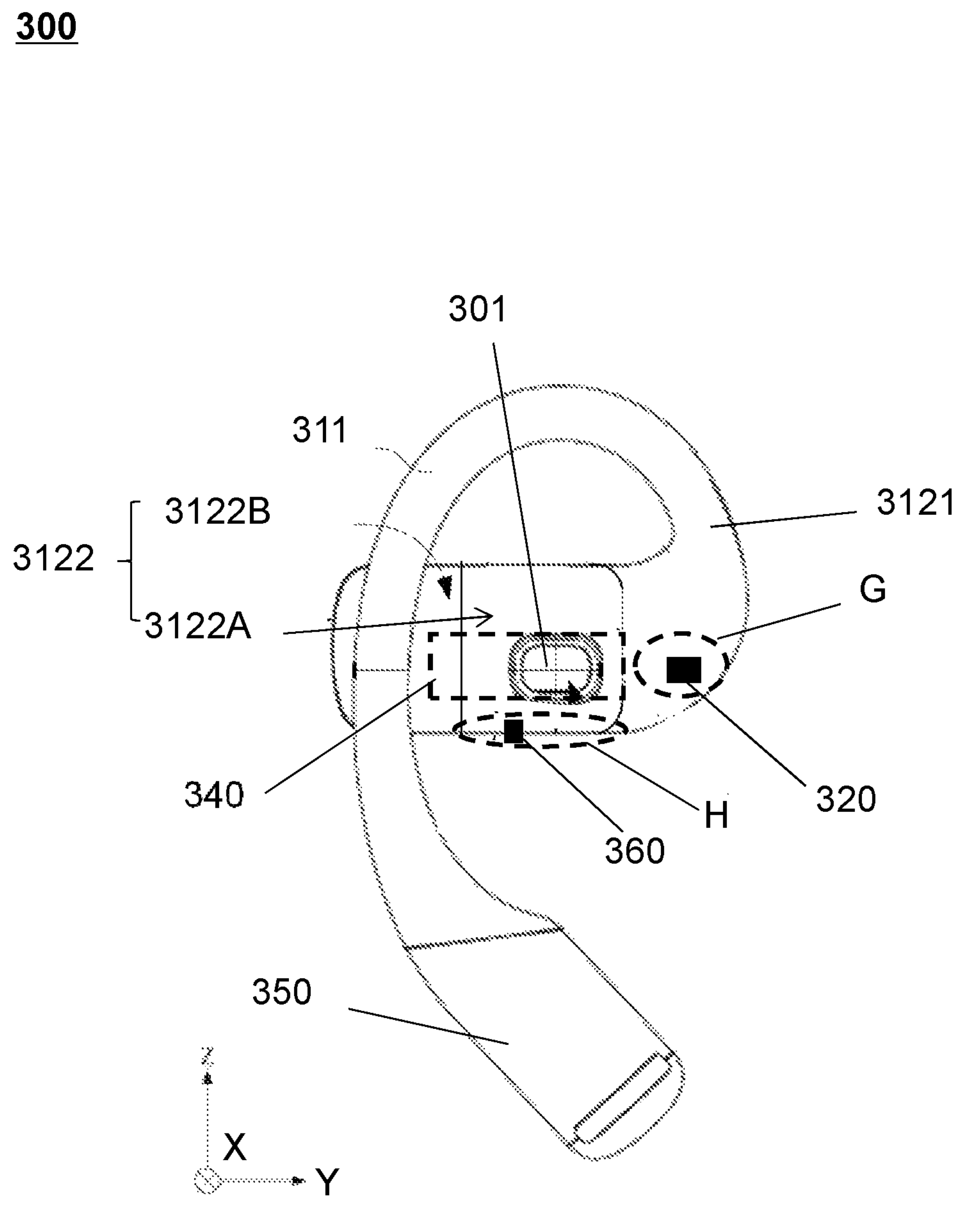
FIG. 10 is a structural diagram illustrating a side of an exemplary earphone facing an ear according to some embodiments of the present disclosure.

FIG. 10 is a structural diagram illustrating a side of an exemplary earphone facing an ear according to some embodiments of the present disclosure.

In some embodiments, referring to FIG. 10, a sound outlet hole 301 may be provided on a side of the holding component 3122 facing the ear, so that a target signal output by the speaker 340 may be transmitted to the ear through the sound outlet hole 301. In some embodiments, the side of the holding component 3122 facing the ear may include a first region 3122A and a second region 3122B. The second region 3122B may be farther away from the connecting component 3121 than the first region 3122A. That is, the second region 3122B may be located at the free end of the holding component 3122 away from the connecting component 3121. In some embodiments, there may be a smooth transition between the first region 3122A and the second region 3122B. In some embodiments, the first region 3122A may be provided with the sound outlet hole 301. The second region 3122B may protrude toward the ear relative to the first region 3122A, so that the second region 3122B may be brought into contact with the ear to allow the sound outlet hole 301 to be spaced from the ear in the wearing state.

In some embodiments, the free end of the holding component 3122 may be configured as a convex hull structure, and on the side surface of the holding component 3122 close to the user's ear, the convex hull structure may protrude outwards (i.e., toward the user's ear) relative to the side surface. Since the speaker 340 can generate a sound (e.g., the target signal) transmitted to the ear through the sound outlet hole 301, the convex hull structure may prevent the ear from blocking the sound outlet hole 301 and the sound produced by the speaker 340 may be weakened or even may not be output. In some embodiments, in a thickness direction (the X-axis direction) of the holding component 3122, a protrusion height of the convex hull structure may be represented by a maximum protrusion height of the second region 3122B relative to the first region 3122A. In some embodiments, the maximum protrusion height of the second region 3122B relative to the first region 3122A may be greater than or equal to 1 mm. In some embodiments, in the thickness direction of the holding component 3122, the maximum protrusion height of the second region 31226 relative to the first region 3122A may be greater than or equal to 0.8 mm. In some embodiments, in the thickness direction of the holding component 3122, the maximum protrusion height of the second region 3122B relative to the first region 3122A may be greater than or equal to 0.5 mm.

In some embodiments, by setting the structure of the holding component 3122, a distance between the sound outlet hole 301 and the user's ear canal may be less than 10 mm when the user wears the earphone 300. In some embodiments, by setting the structure of the holding component 3122, a distance between the sound outlet hole 301 and the user's ear canal may be less than 8 mm when the user wears the earphone 300. In some embodiments, by setting the structure of the holding component 3122, a distance between the sound outlet hole 301 and the user's ear canal may be less than 7 mm when the user wears the earphone 300. In some embodiments, by setting the structure of the holding component 3122, a distance between the sound outlet hole 301 and the user's ear canal may be less than 6 mm when the user wears the earphone 300.

It should be noted that if merely for that the sound outlet hole 301 is spaced from the ear in the wearing state, a region protrudes more toward the ear than with the first region 3122A may also be located in other regions of the holding component 3122, such as a region between the sound outlet hole 301 and the connecting component 3121. In some embodiments, since the concha cavity and the cymba concha have a certain depth and communicate with the ear hole, an orthographic projection of the sound outlet hole 301 on the ear along the thickness direction of the holding component 3122 may at least partially fall within the concha cavity and/or the cymba concha. Merely by way of example, when the user wears the earphone 300, the holding component 3122 may be located on the side of the ear hole close to the top of the user's head and contact with the helix. At this time, the orthographic projection of the sound outlet hole 301 on the ear along the thickness direction of the holding component 3122 may at least partially fall within the cymba concha.

Figure 11:
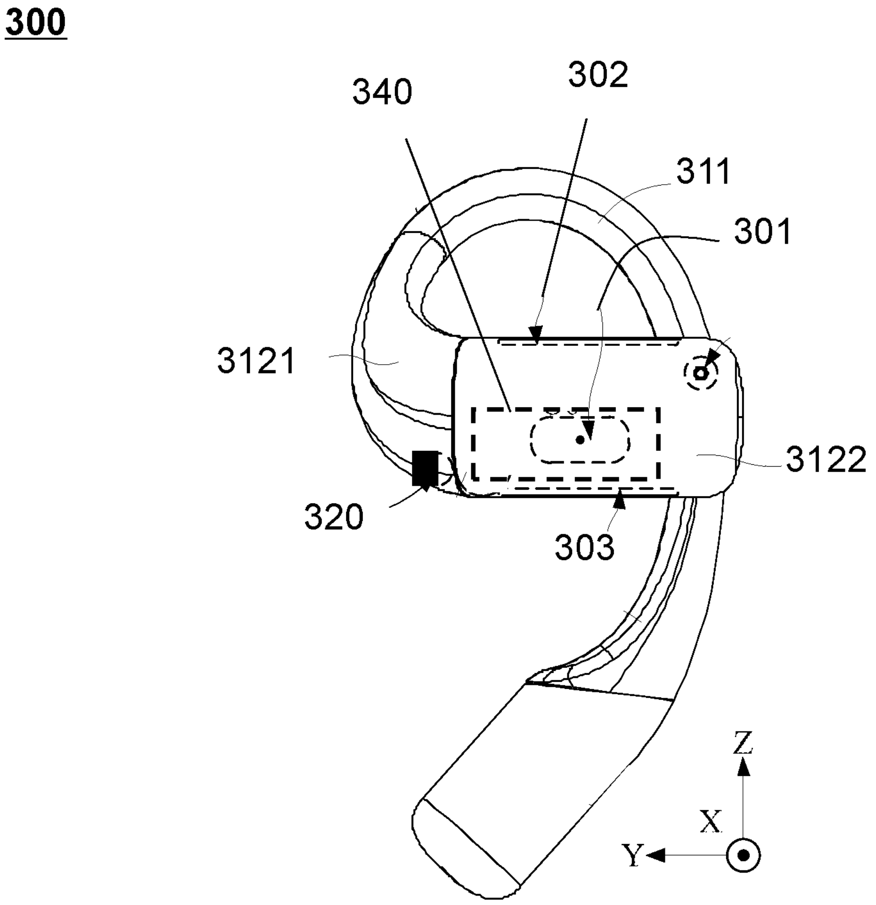
FIG. 11 is a structural diagram illustrating a side of an exemplary earphone facing away from an ear according to some embodiments of the present disclosure.
Figure 12:
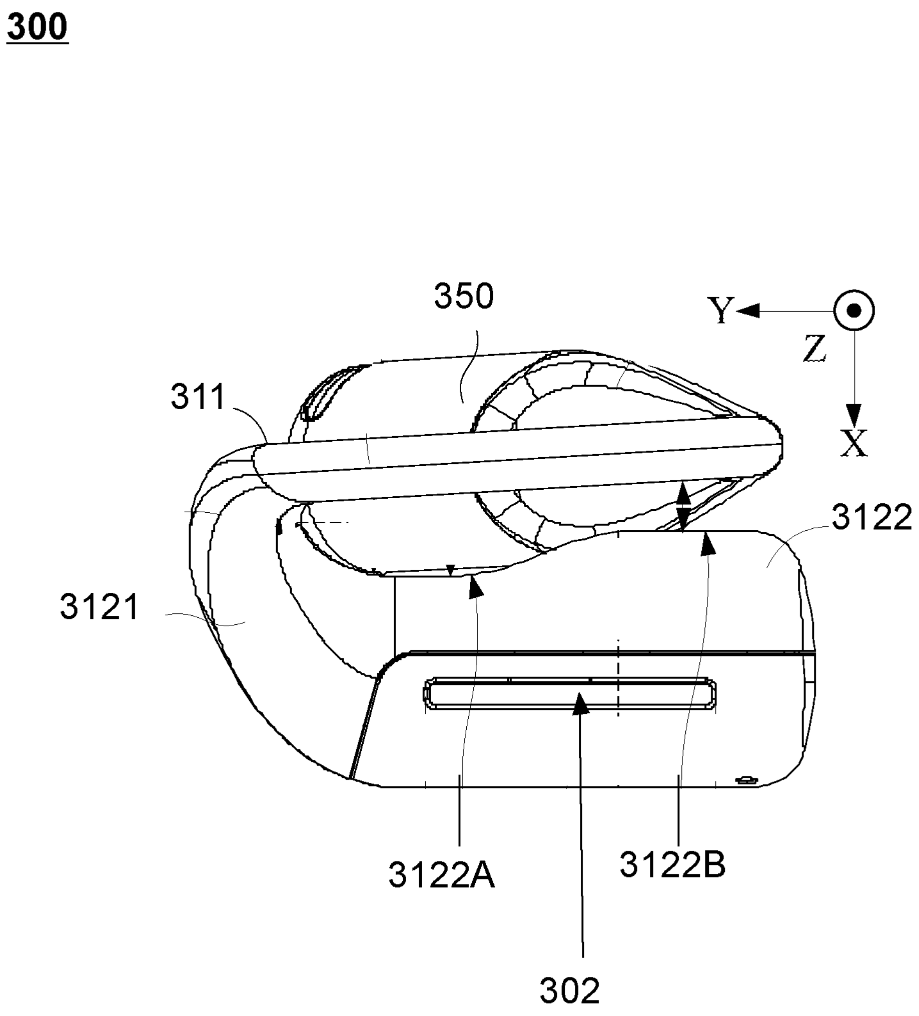
FIG. 12 is a top view illustrating an exemplary earphone according to some embodiments of the present disclosure.

FIG. 11 is a structural diagram illustrating a side of an exemplary earphone facing away from an ear according to some embodiments of the present disclosure. FIG. 12 is a top view illustrating an exemplary earphone according to some embodiments of the present disclosure.

Referring to FIGS. 11-12, a pressure relief hole 302 may be provided on a side of the holding component 3122 along a vertical axis direction (the Z-axis) and close to a top of the user's head, and the pressure relief hole may be farther away from the user's ear canal than the sound outlet hole 301. In some embodiments, an opening direction of the pressure relief hole 302 may face the top of the user's head, and there may be a specific included angle between the opening direction of the pressure relief hole 302 and the vertical axis (the Z-axis) to allow the pressure relief hole 302 to be farther away from the user's ear canal, thereby making it difficult for the user to hear the sound output through the pressure relief hole 302 and transmitted to the user's ear. In some embodiments, the included angle between the opening direction of the pressure relief hole 302 and the vertical axis (the Z-axis) may be in a range of 0° to 10°. In some embodiments, the included angle between the opening direction of the pressure relief hole 302 and the vertical axis (the Z-axis) may be in a range of 0° to 8°. In some embodiments, the included angle between the opening direction of the pressure relief hole 302 and the vertical axis (the Z-axis) may be in a range of 0° to 5°.

In some embodiments, by setting the structure of the holding component 3122 and the included angle between the opening direction of the pressure relief hole 302 and the vertical axis (the Z-axis), a distance between the pressure relief hole 302 and the user's ear canal may be within an appropriate range when the user wears the earphone 300. In some embodiments, when the user wears the earphone 300, the distance between the pressure relief hole 302 and the user's ear canal may be in a range of 5 mm to 20 mm. In some embodiments, when the user wears the earphone 300, the distance between the pressure relief hole 302 and the user's ear canal may be in a range of 5 mm to 18 mm. In some embodiments, when the user wears the earphone 300, the distance between the pressure relief hole 302 and the user's ear canal may be in a range of 5 mm to 15 mm. In some embodiments, when the user wears the earphone 300, the distance between the pressure relief hole 302 and the user's ear canal may be in a range of 6 mm to 14 mm. In some embodiments, when the user wears the earphone 300, the distance between the pressure relief hole 302 and the user's ear canal may be in a range of 8 mm to 10 mm.

Figure 13:
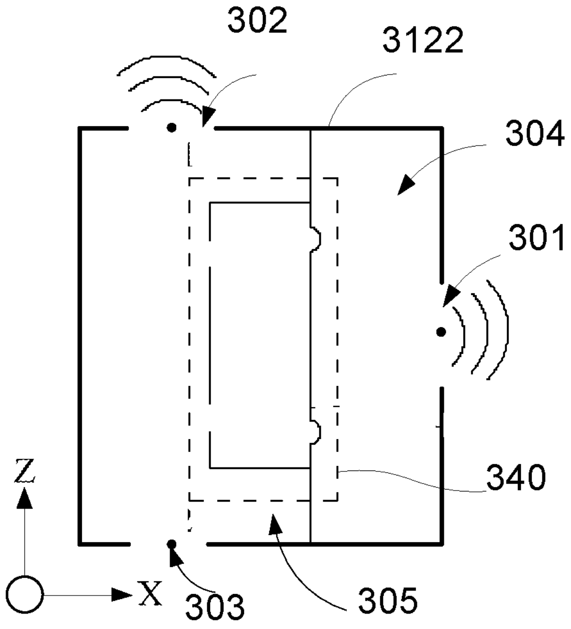
FIG. 13 is a schematic diagram illustrating a cross-sectional structure of an exemplary earphone according to some embodiments of the present disclosure.

FIG. 13 is a schematic diagram illustrating a cross-sectional structure of an exemplary earphone according to some embodiments of the present disclosure.

FIG. 13 shows an acoustic structure formed by a holding component (e.g., the holding component 3122) of the earphone (e.g., the earphone 300). The acoustic structure includes the sound outlet hole 301, the pressure relief hole 302, a sound adjustment hole 303, a front cavity 304, and a rear cavity 305.

In some embodiments, as described in connection with FIGS. 11-13, the holding component 3122 may respectively form the front cavity 304 and the rear cavity 305 on opposite sides of the speaker 340. The front cavity 304 may be connected with outside of the earphone 300 through the sound outlet hole 301, and output sound (e.g., a target signal, an audio signal, etc.) to an ear. The rear cavity 305 may be connected with outside of the earphone 300 through the pressure relief hole 302, and the pressure relief hole 302 may be farther away from the user's ear canal than the sound outlet hole 301. In some embodiments, the pressure relief hole 302 may allow air to freely flow in and out of the rear cavity 305 so that changes in air pressure in the front cavity 304 may not be blocked by the rear cavity 305 as much as possible, thereby improving sound quality of the sound output to the ear through the sound outlet hole 301.

In some embodiments, an included angle between a thickness direction (the X-axis direction) of the holding component 3122 and a connection line between the pressure relief hole 302 and the sound outlet hole 301 may be in a range of 0° to 50°. In some embodiments, the included angle between the thickness direction (the X-axis direction) of the holding component 3122 and the connection line between the pressure relief hole 302 and the sound outlet hole 301 may be in a range of 5° to 45°. In some embodiments, the included angle between the thickness direction (the X-axis direction) of the holding component 3122 and the connection line between the pressure relief hole 302 and the sound outlet hole 301 may be in a range of 10° to 40°. In some embodiments, the included angle between the thickness direction (the X-axis direction) of the holding component 3122 and the connection line between the pressure relief hole 302 and the sound outlet hole 301 may be in a range of 15° to 35°. It should be noted that the included angle between the thickness direction of the holding component and the connection line between the pressure relief hole and the sound outlet hole may be an included angle between the thickness direction of the holding component 3122 and a connection line between a center of the pressure relief hole 302 and a center of the sound outlet hole 301.

In some embodiments, as described in connection with FIGS. 11-13, the sound outlet hole 301 and the pressure relief hole 302 may be regarded as two sound sources that radiate sounds outward, and the radiated sounds have the same amplitude and opposite phases. The two sound sources may approximately form an acoustic dipole or may be similar to an acoustic dipole, so the sound radiated outward may have obvious directivity, forming a “8”-shaped sound radiation region. In a direction of a straight line connecting the two sound sources, the sound radiated by the two sound sources may be the loudest, and the sound radiated in other directions may be significantly reduced. The sound radiated at a mid-perpendicular line of the connecting line between the two sound sources may be the lightest. That is, in a direction of a straight line where the pressure relief hole 302 and the sound outlet hole 301 are connected, the sound radiated by the pressure relief hole 302 and the sound outlet hole 301 may be the loudest, and the sound radiated in other directions may be significantly reduced. The sound radiated at a mid-perpendicular line of the connecting line between the pressure relief hole 302 and the sound outlet hole 301 may be the lightest. In some embodiments, the acoustic dipole formed by the pressure relief hole 302 and the sound outlet hole 301 may reduce the sound leakage of the speaker 340.

In some embodiments, as described in connection with FIGS. 11-13, the holding component 3122 may also be provided with the sound adjustment hole 303 connected to the rear cavity 305. The sound adjustment hole 303 may be configured to destroy a high pressure region of a sound field in the rear cavity 305, so that a wavelength of a standing wave in the rear cavity 305 may be shortened, and a resonance frequency of a sound output to outside of the earphone 300 through the pressure relief hole 302 may be made as high as possible, for example, greater than 4 kHz, so as to reduce the sound leakage of the speaker 340. In some embodiments, the sound adjustment hole 303 and the pressure relief hole 302 may be located on opposite sides of the speaker 340, for example, the sound adjustment hole 303 and the pressure relief hole 302 may be disposed opposite to each other in the Z-axis direction, so as to destroy the high pressure region of the sound field in the rear cavity 305 to the greatest extent. In some embodiments, compared with the pressure relief hole 302, the sound adjustment hole 303 may be farther away from the sound outlet hole 301, so as to increase a distance between the sound adjustment hole 303 and the sound outlet hole 301 as much as possible, thereby reducing inversion cancellation between the sound output from the sound adjustment hole 303 to the outside of the earphone 300 and the sound transmitted to the ear through the sound outlet hole 301.

In some embodiments, a target signal output by the speaker 340 through the sound outlet hole 301 and/or the pressure relief hole 302 may also be picked up by the first microphone array 320. The target signal may affect the estimation of a sound field at a target spatial position by the processor 330, that is, the target signal output by the speaker 340 may not be expected to be picked up. In this case, in order to reduce an influence of the target signal output by the speaker 340 on the first microphone array 320, the first microphone array 320 may be disposed in a first target region where sound output by the speaker 340 is as light as possible. In some embodiments, the first target region may be or near an acoustic zero point position of a radiated sound field of the acoustic dipole formed by the pressure relief hole 302 and the sound outlet hole 301. In some embodiments, the first target region may be a region G shown in FIG. 10. When the user wears the earphone 300, the region G may be located in front of the sound outlet hole 301 and/or the pressure relief hole 302 (the front here may refer to a direction the user faces), that is, the region G may be relatively close to the user's eyes. Optionally, the region G may be a partial region on the connecting component 3121 of the fixing structure 310. That is, the first microphone array 320 may be located in the connecting component 3121. For example, the first microphone array 320 may be located at a position of the connecting component 3121 that is close to the holding component 3122. In some alternative embodiments, the region G may also be located behind the sound outlet hole 301 and/or the pressure relief hole 302 (the behind here may refer to a direction opposite to the direction the user faces). For example, the region G may be located on an end of the holding component 3122 away from the connecting component 3121.

In some embodiments, referring to FIGS. 10-11, in order to reduce the influence of the target signal output by the speaker 340 on the first microphone array 320 and improve the effect of active noise reduction of the earphone 300, a relative position relationship between the first microphone array 320 and the sound outlet hole 301 and/or the pressure relief hole 302 may be reasonably disposed. The position of the first microphone array 320 here may be a position where any microphone in the first microphone array 320 is located. In some embodiments, a first included angle may be formed between a connection line between the first microphone array 320 and the sound outlet hole 301 and a connection line between the sound outlet hole 301 and the pressure relief hole 302. A second included angle may be formed between a connection line between the first microphone array 320 and the pressure relief hole 302 and the connection line between the sound outlet hole 301 and the pressure relief hole 302. In some embodiments, a difference between the first included angle and the second included angle may be less than or equal to 30°. In some embodiments, the difference between the first included angle and the second included angle may be less than or equal to 25°. In some embodiments, the difference between the first included angle and the second included angle may be less than or equal to 20°. In some embodiments, the difference between the first included angle and the second included angle may be less than or equal to 15°. In some embodiments, the difference between the first included angle and the second included angle may be less than or equal to 10°.

In some embodiments, a distance between the first microphone array 320 and the sound outlet hole 301 may be a first distance. A distance between the first microphone array 320 and the pressure relief hole 302 may be a second distance. In order to ensure that the target signal output by the speaker 340 has little influence on the first microphone array 320, a difference between the first distance and the second distance may be less than or equal to 6 mm. In some embodiments, the difference between the first distance and the second distance may be no more than 5 mm. In some embodiments, the difference between the first distance and the second distance may be less than or equal to 4 mm. In some embodiments, the difference between the first distance and the second distance may be less than or equal to 3 mm.

It can be understood that a position relationship between the first microphone array 320 and the sound outlet hole 301 and/or the pressure relief hole 302 described herein may refer to a position relationship between any microphone in the first microphone array 320 and the center of the sound outlet hole 301 and/or the center of the pressure relief hole 302. For example, the first included angle formed by the connection line between the first microphone array 320 and the sound outlet hole 301 and the connection line between the sound outlet hole 301 and the pressure relief hole 302 may refer to a first included angle formed by a connection line between any microphone in the first microphone array 320 and the center of the sound outlet hole 301 and a connection line between the center of the sound outlet hole 301 and the center of the pressure relief hole 302. As another example, the first distance between the first microphone array 320 and the sound outlet hole 301 may refer to a first distance between any microphone in the first microphone array 320 and the center of the sound outlet hole 301.

In some embodiments, the first microphone array 320 may be disposed at the acoustic zero point position of the acoustic dipole formed by the sound outlet hole 301 and the pressure relief hole 302, so that the first microphone array 320 may be minimally affected by the target signal output by the speaker 340, and the first microphone array 320 may pick up the environmental noise near the user's ear canal with an improved accuracy. Further, the processor 330 may more accurately estimate the environmental noise at the user's ear canal based on the environmental noise picked up by the first microphone array 320 and generate a noise reduction signal, thereby better implementing the active noise reduction of the earphone 300. Detailed description regarding the active noise reduction of the earphone 300 using the first microphone array 320 may be found in FIGS. 14-16, and relevant descriptions thereof.

Figure 14:
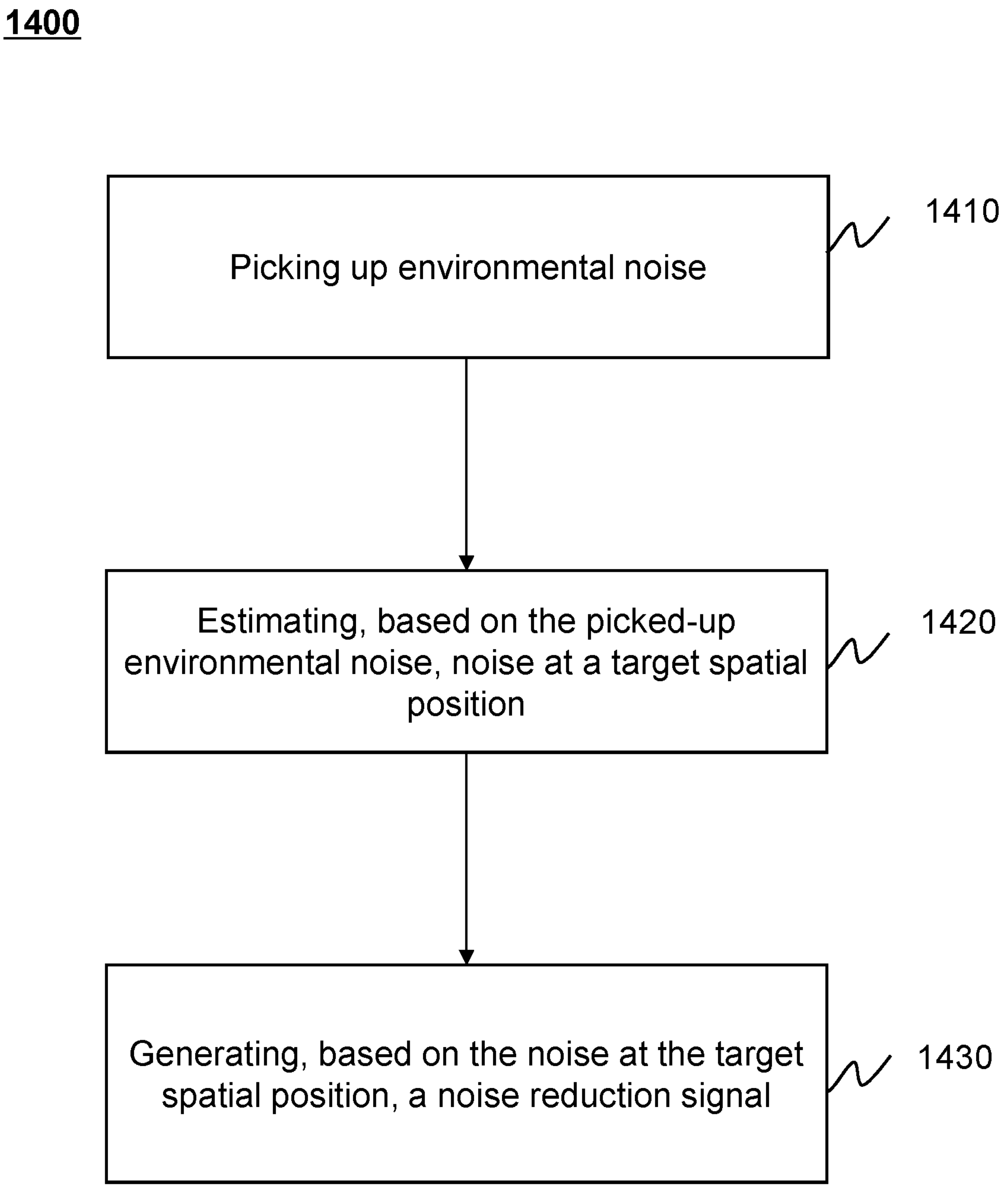
FIG. 14 is a flowchart illustrating an exemplary process for reducing noise of an earphone according to some embodiments of the present disclosure.

FIG. 14 is a flowchart illustrating an exemplary process for reducing noise of an earphone according to some embodiments of the present disclosure. In some embodiments, the process 1400 may be performed by the earphone 300. As shown in FIG. 14, the process 1400 may include the following operations.

In 1410, environmental noise may be picked up. In some embodiments, the operation may be performed by the first microphone array 320.

In some embodiments, the environmental noise may refer to a combination of various external sounds (e.g., a traffic noise, an industrial noise, a building construction noise, a social noise) in an environment where a user is located. In some embodiments, the first microphone array 320 located near the body part 312 of the earphone 300 and close to the user's ear canal may be configured to pick up the environmental noise near the user's ear canal. Further, the first microphone array 320 may convert a picked-up environmental noise signal into an electrical signal and transmit the electrical signal to the processor 330 for processing.

In 1420, noise at a target spatial position may be estimated based on the picked-up environmental noise. In some embodiments, the operation may be performed by the processor 330.

In some embodiments, the processor 330 may perform a signal separation operation on the picked-up environmental noise. In some embodiments, the environmental noise picked up by the first microphone array 320 may include various sounds. The processor 330 may perform a signal analysis operation on the environmental noise picked up by the first microphone array 320 to separate the various sounds. Specifically, the processor 330 may adaptively adjust parameters of a filter according to statistical distribution characteristics and structural characteristics of various sounds in different dimensions such as space, time, frequency, etc. The processor 330 may estimate parameter information of each sound signal in the environmental noise, and perform the signal separation operation according to the parameter information of each sound signal. In some embodiments, the statistical distribution characteristics of noise may include a probability distribution density, a power spectral density, a autocorrelation function, a probability density function, a variance, a mathematical expectation, etc. In some embodiments, the structural characteristics of noise may include a noise distribution, a noise intensity, a global noise intensity, a noise rate, etc., or any combination thereof. The global noise intensity may refer to an average noise intensity or a weighted average noise intensity. The noise rate may refer to a degree of dispersion of the noise distribution. Merely by way of example, the environmental noise picked up by the first microphone array 320 may include a first signal, a second signal, and a third signal. The processor 330 may obtain differences among the first signal, the second signal, and the third signal in space (e.g., a position where the signals are located), time domain (e.g., delay), and frequency domain (e.g., amplitude, phase), and separate the first signal, the second signal, and the third signal according to the differences in the three dimensions to obtain relatively pure first signal, second signal, and third signal. Further, the processor 330 may update the environmental noise according to the parameter information (e.g., frequency information, phase information, amplitude information) of the separated signals. For example, the processor 330 may determine that the first signal is a user's call sound according to the parameter information of the first signal, and remove the first signal from the environmental noise to update the environmental noise. In some embodiments, the removed first signal may be transmitted to a far end associated with the call. For example, when the user wears the earphone 300 for a voice call, the first signal may be transmitted to the far end associated with the call.

The target spatial position may be a position determined based on the first microphone array 320 at or near the user's ear canal. The target spatial position may refer to a spatial position close to the user's ear canal (e.g., an earhole) at a certain distance (e.g., 2 mm, 3 mm, 5 mm, etc.). In some embodiments, the target spatial position may be closer to the user's ear canal than any microphone in the first microphone array 320. In some embodiments, the target spatial position may be related to a count of microphones in the first microphone array 320 and their distribution positions relative to the user's ear canal. The target spatial position may be adjusted by adjusting the count of the microphones in the first microphone array 320 and/or their distribution positions relative to the user's ear canal. In some embodiments, to estimate the noise at the target spatial position based on the picked-up environmental noise (or updated environmental noise), the processor 330 may determine one or more spatial noise sources associated with the picked-up environmental noise, and estimate the noise at the target spatial position based on the spatial noise sources. The environmental noise picked up by the first microphone array 320 may come from different azimuths and different types of spatial noise sources. Parameter information (e.g., frequency information, phase information, amplitude information) corresponding to each spatial noise source may be different. In some embodiments, the processor 330 may perform the signal separation and extraction on the noise at the target spatial location according to statistical distribution and structural characteristics of different types of noise in different dimensions (e.g., spatial domain, time domain, frequency domain, etc.), thereby obtaining different types (e.g., different frequencies, different phases, etc.) of noises, and estimate the parameter information (e.g., amplitude information, phase information, etc.) corresponding to each noise. In some embodiments, the processor 330 may also determine overall parameter information of the noise at the target spatial position according to the parameter information corresponding to different types of noise at the target spatial position. More descriptions regarding estimating the noise at the target spatial position based on one or more spatial noise sources may be found elsewhere in the present disclosure (e.g., FIG. 15 and relevant descriptions thereof).

In some embodiments, to estimate the noise at the target spatial position based on the picked-up environmental noise (or the updated environmental noise), the processor 330 may further construct a virtual microphone based on the first microphone array 320, and estimate the noise at the target spatial position based on the virtual microphone. More descriptions regarding the estimating the noise at the target spatial position based on the virtual microphone may be found elsewhere in the present disclosure (e.g., FIG. 16 and relevant descriptions thereof).

In 1430, a noise reduction signal may be generated based on the noise at the target spatial position. In some embodiments, the operation may be performed by the processor 330.

In some embodiments, the processor 330 may generate the noise reduction signal based on the parameter information (e.g., amplitude information, phase information, etc.) of the noise at the target spatial position obtained in operation 1420. In some embodiments, a phase difference between a phase of the noise reduction signal and a phase of the noise at the target spatial position may be less than or equal to a preset phase threshold. The preset phase threshold may be within a range of 90 degrees-180 degrees. The preset phase threshold may be adjusted within the range according to the user's needs. For example, when the user does not want to be disturbed by sound of a surrounding environment, the preset phase threshold may be a larger value, such as 180 degrees, that is, the phase of the noise reduction signal may be opposite to the phase of the noise at the target spatial position. As another example, when the user wants to be sensitive to the surrounding environment, the preset phase threshold may be a smaller value, such as 90 degrees. It should be noted that if the user wants to receive more sound of the surrounding environment, the preset phase threshold may be set to be closer to 90 degrees; and if the user wants to receive less sound of the surrounding environment, the preset phase threshold may be set to be close to 180 degrees. In some embodiments, when the phase of the noise reduction signal and the phase of the noise at the target spatial position are determined (for example, the phase is opposite), an amplitude difference between an amplitude of the noise at the target spatial position and an amplitude of the noise reduction signal may be less than or equal to a preset amplitude threshold. For example, when the user does not want to be disturbed by sound of the surrounding environment, the preset amplitude threshold may be a small value, such as 0 dB, that is, the amplitude of the noise reduction signal may be equal to the amplitude of the noise at the target spatial position. As another example, when the user wants to be sensitive to the surrounding environment, the preset amplitude threshold may be a relatively large value, for example, approximately equal to the amplitude of the noise at the target spatial position. It should be noted that, if the user wants to receive more sound of the surrounding environment, the preset amplitude threshold may be set to be closer to the amplitude of the noise at the target spatial position, and if the user wants to receive more sound of the surrounding environment, the preset amplitude threshold may be set to be closer to 0 dB.

In some embodiments, the speaker 340 may output, based on the noise reduction signal generated by the processor 330, a target signal. For example, the speaker 340 may convert the noise reduction signal (e.g., an electrical signal) into the target signal (i.e., a vibration signal) based on a vibration component thereof. The target signal may be transmitted to the user's ear through the sound outlet hole 301 on the earphone 300, and cancel out the environmental noise at the user's ear canal. In some embodiments, when the noise at the target spatial position is regarded as a plurality of spatial noise sources, the speaker 340 may output target signals corresponding to the plurality of spatial noise sources based on the noise reduction signal. For example, the plurality of spatial noise sources may include a first spatial noise source and a second spatial noise source. The speaker 340 may output a first target signal having an approximately opposite phase and approximately equal amplitude to noise of the first spatial noise source to cancel out the noise of the first spatial noise source, and output a second target signal having an approximately opposite phase and approximately equal amplitude to noise of the second spatial noise source to cancel out the noise of the second spatial noise source. In some embodiments, when the speaker 340 is an air conduction speaker, a position where the target signal cancels out the environmental noise may be the target spatial position. A distance between the target spatial position and the user's ear canal is relatively small, and the noise at the target spatial position may be approximately regarded as the noise at the user's ear canal. Therefore, the mutual cancellation of the noise reduction signal and the noise at the target spatial position may be approximated as the cancellation of the environmental noise transmitted to the user's ear canal, thereby realizing the active noise reduction of the earphone 300. In some embodiments, when the speaker 340 is a bone conduction speaker, a position where the target signal cancels out the environmental noise may be a basilar membrane. The target signal and the environmental noise may be canceled out at the basilar membrane of the user, thereby realizing the active noise reduction of the earphone 300.

In some embodiments, when a position of the earphone 300 changes, for example, when the head of the user wearing the earphone 300 rotates, the environmental noise (e.g., the direction, the amplitude, and the phase of the noise) may change accordingly, a speed at which the earphone 300 performs noise reduction may be difficult to keep up with a changing speed of the environmental noise, which may lead to weakening of the active noise reduction function of the earphone 300. Therefore, the earphone 300 may also include one or more sensors, which may be located anywhere on the earphone 300, e.g., the hook-shaped component 311, the connecting component 3121, and/or the holding component 3122. The one or more sensors may be electrically connected to other components of the earphone 300 (e.g., the processor 330). In some embodiments, the one or more sensors may be configured to obtain a physical position and/or motion information of the earphone 300. Merely by way of example, the one or more sensors may include an inertial measurement unit (IMU), a global positioning system (GPS), a Radar, etc. The motion information may include a motion trajectory, a motion direction, a motion speed, a motion acceleration, a motion angular velocity, a motion-related time information (e.g., a motion start time, a motion end time), or the like, or any combination thereof. Taking IMU as an example, the IMU may include a micro electro mechanical system (MEMS). The MEMS may include a multi-axis accelerometer, a gyroscope, a magnetometer, or the like, or any combination thereof. The IMU may be configured to detect the physical position and/or the motion information of the earphone 300 to realize the control of the earphone 300 based on the physical position and/or the motion information.

In some embodiments, the processor 330 may update the noise at the target spatial position and the estimated sound field at the target spatial position based on the motion information (e.g., the motion trajectory, the motion direction, the motion speed, the motion acceleration, the motion angular velocity, the motion-related time information) of the earphone 300 obtained by the one or more sensors of the earphone 300. Further, the processor 330 may generate, based on the updated noise at the target spatial position and the updated estimated sound field at the target spatial position, the noise reduction signal. The one or more sensors may record the motion information of the earphone 300, and then the processor 330 may quickly update the noise reduction signal, which can improve noise tracking performance of the earphone 300, so that the noise reduction signal can more accurately eliminate the environmental noise, and further improve the noise reduction effect and the user's listening experience.

It should be noted that the above description of the process 1400 is merely provided for the purpose of illustration, and is not intended to limit the scope of the present disclosure. For persons having ordinary skills in the art, a plurality of modifications and variations may be made to the process 1400 under the teachings of the present disclosure. For example, operations in the process 1400 may also be added, omitted, or combined. However, those modifications and variations do not depart from the scope of the present disclosure.

Figure 15:
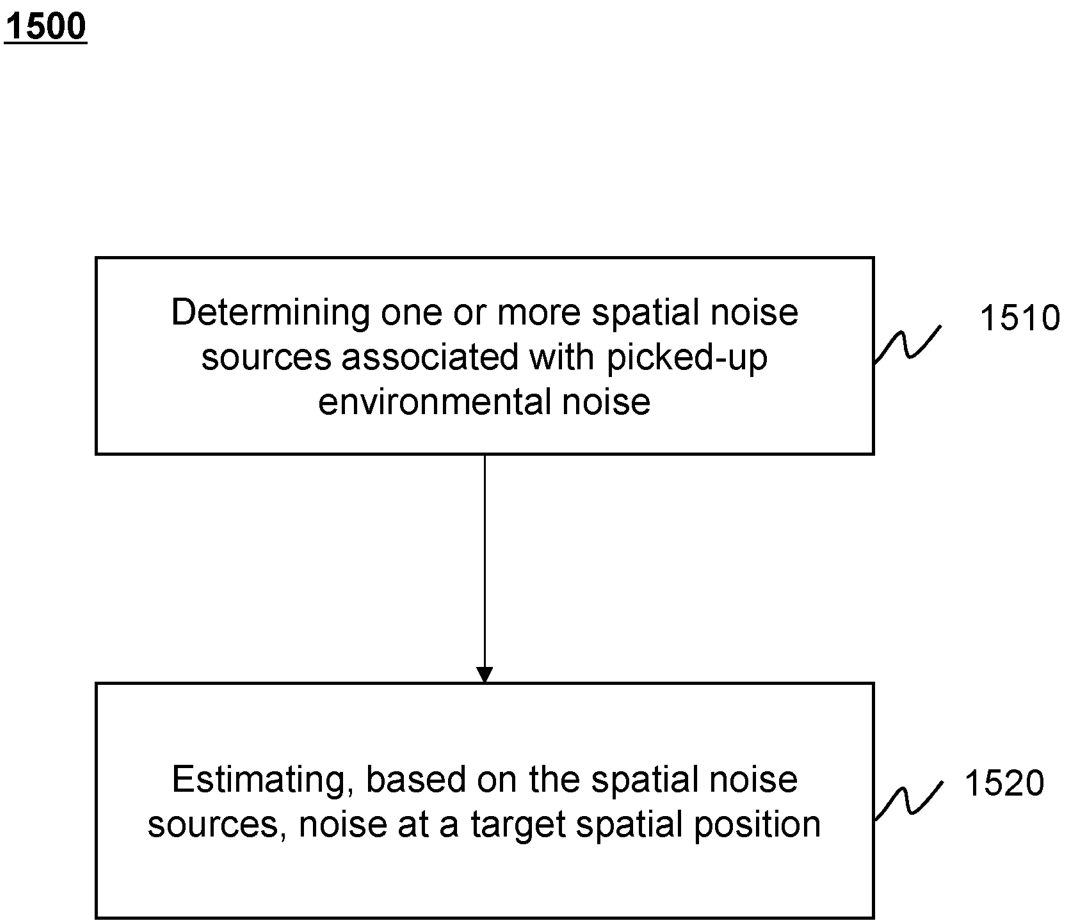
FIG. 15 is a flowchart illustrating an exemplary process for estimating noise at a target spatial position according to some embodiments of the present disclosure.

FIG. 15 is a flowchart illustrating an exemplary process for estimating noise at a target spatial position according to some embodiments of the present disclosure. As shown in FIG. 15, the process 1500 may include the following operations.

In 1510, one or more spatial noise sources associated with environmental noise picked up by the first microphone array 320 may be determined. In some embodiments, the operation may be performed by the processor 330. As described herein, determining a spatial noise source may refer to determining information about the spatial noise source, such as a position of the spatial noise source (including an orientation of the spatial noise source, a distance between the spatial noise source and the target spatial position, etc.), a phase of the spatial noise source, an amplitude of the spatial noise source, etc.

In some embodiments, the spatial noise source associated with environmental noise may refer to a noise source whose sound waves can be delivered to the user's ear canal (e.g., the target spatial position) or close to the user's ear canal. In some embodiments, the spatial noise source may be a noise source from different directions (e.g., front, rear, etc.) of the user's body. For example, there may be a crowd noise in front of the user's body and a vehicle whistle noise on the left side of the user's body. In this case, the spatial noise source may include a crowd noise source in front of the user's body and a vehicle whistle noise source to the left of the user's body. In some embodiments, the first microphone array 320 may pick up a spatial noise in all directions of the user's body, convert the spatial noise into an electrical signal, and transmit the electrical signal to the processor 330. The processor 330 may obtain parameter information (e.g., frequency information, amplitude information, phase information, etc.) of the picked-up spatial noise in various directions by analyzing the electrical signal corresponding to the spatial noise. The processor 330 may determine information (e.g., the orientation of the spatial noise source, a distance of the spatial noise source, a phase of the spatial noise source, an amplitude of the spatial noise source, etc.) of the spatial noise source in various directions according to the parameter information of the spatial noise in various directions. In some embodiments, the processor 330 may determine the spatial noise source through a noise positioning algorithm based on the spatial noise picked up by the first microphone array 320. The noise positioning algorithm may include a beamforming algorithm, a super-resolution spatial spectrum estimation algorithm, a time difference of arrival algorithm (also referred to as a delay estimation algorithm), or the like, or any combination thereof.

In some embodiments, the processor 330 may divide the picked-up environmental noise into a plurality of frequency bands according to a specific frequency band width (e.g., each 500 Hz as a frequency band). Each frequency band may correspond to a different frequency range. In at least one frequency band, a spatial noise source corresponding to the frequency band may be determined. For example, the processor 330 may perform signal analysis on the frequency bands divided from the environmental noise, obtain parameter information of the environmental noise corresponding to each frequency band, and determine the spatial noise source corresponding to each frequency band according to the parameter information.

In 1520, noise at a target spatial position may be estimated based on the spatial noise sources. In some embodiments, the operation may be performed by the processor 330. As described herein, the estimating the noise at the target spatial position may refer to estimating parameter information of the noise at the target spatial position, such as frequency information, amplitude information, phase information, etc.

In some embodiments, the processor 330 may respectively estimate parameter information of a noise transmitted by each spatial noise source to the target spatial position based on the parameter information (e.g., the frequency information, the amplitude information, the phase information, etc.) of the spatial noise sources located in various directions of the user's body obtained in the operation 1510, thereby estimating the noise at the target spatial position. For example, there is a spatial noise source in a first orientation (e.g., front) and a second orientation (e.g., rear) of the user's body, respectively. The processor 330 may estimate frequency information, phase information, or amplitude information of the first orientation spatial noise source when the noise of the first orientation spatial noise source is transmitted to the target spatial position according to the position information, the frequency information, the phase information, or the amplitude information of the first orientation spatial noise source. The processor 330 may estimate frequency information, phase information, or amplitude information of the second orientation spatial noise source when the noise of the second orientation spatial noise source is transmitted to the target spatial position according to the position information, the frequency information, the phase information, or the amplitude information of the second orientation spatial noise source. Further, the processor 330 may estimate the noise information of the target spatial position based on the frequency information, the phase information, or the amplitude information of the first orientation spatial noise source and the second orientation spatial noise source, thereby estimating the noise information of the target spatial position. Merely by way of example, the processor 330 may estimate the noise information of the target spatial location using a virtual microphone technology or other techniques. In some embodiments, the processor 330 may extract the parameter information of the noise of the spatial noise source from a frequency response curve of the spatial noise source picked up by the microphone array through a feature extraction technique. In some embodiments, the technique for extracting the parameter information of the noise of the spatial noise source may include, but is not limited to, a principal components analysis (PCA) technique, an independent component algorithm (ICA), a linear discriminant analysis (LDA) technique, a singular value decomposition (SVD) technique, etc.

It should be noted that the above description of the process 1500 is merely provided for the purpose of illustration, and is not intended to limit the scope of the present disclosure. For persons having ordinary skills in the art, a plurality of modifications and variations may be made to the process 1500 under the teachings of the present disclosure. For example, the process 1500 may further include operations of positioning the spatial noise source, extracting the parameter information of the noise of the spatial noise source, etc. However, those modifications and variations do not depart from the scope of the present disclosure.

Figure 16:
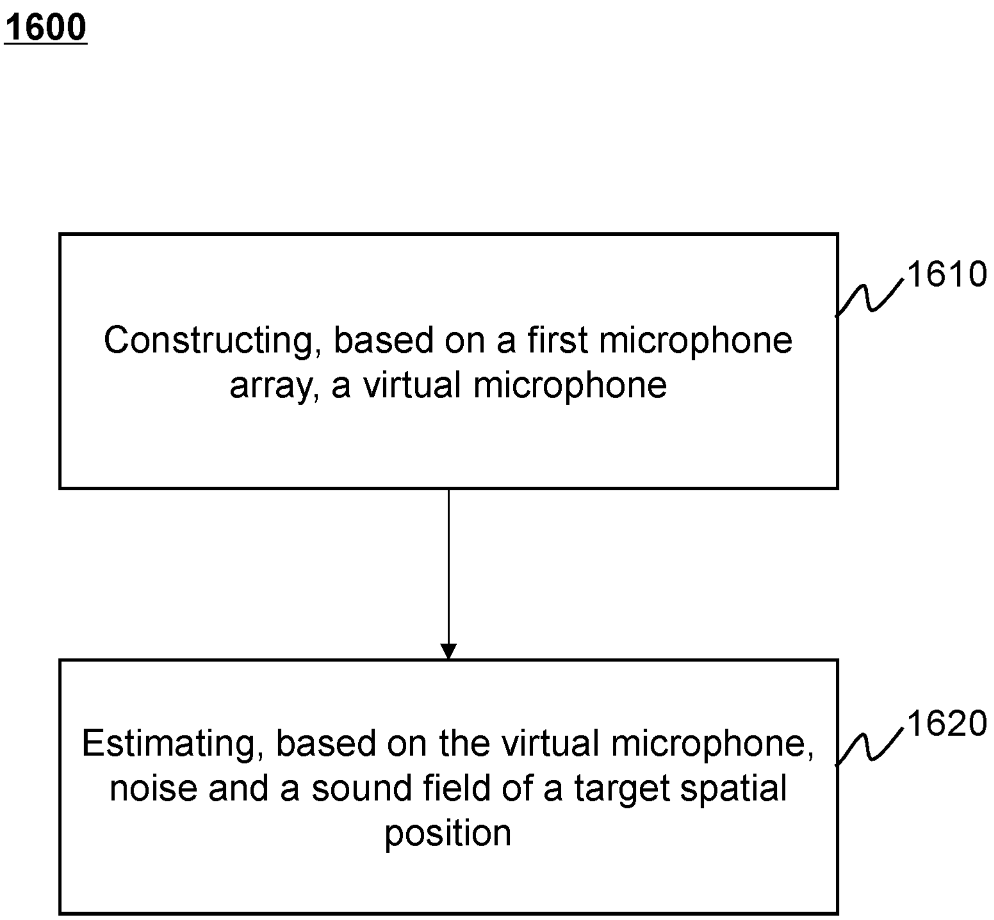
FIG. 16 is a flowchart illustrating an exemplary process for estimating a sound field and noise at a target spatial position according to some embodiments of the present disclosure.

FIG. 16 is a flowchart illustrating an exemplary process for estimating a sound field and the noise at a target spatial position according to some embodiments of the present disclosure. As shown in FIG. 16, the process 1600 may include the following operations.

In 1610, a virtual microphone may be constructed based on the first microphone array 320. In some embodiments, the operation may be performed by the processor 330.

In some embodiments, the virtual microphone may be configured to represent or simulate audio data collected by a microphone located at the target spatial position. That is, audio data obtained by the virtual microphone may be similar or equivalent to the audio data collected by the physical microphone if a physical microphone is placed at the target spatial position.

In some embodiments, the virtual microphone may include a mathematical model. The mathematical model may embody a relationship among noise or an estimated sound field of the target spatial position, parameter information (e.g., frequency information, amplitude information, phase information, etc.) of environmental noise picked up by a microphone array (e.g., the first microphone array 320), and parameters of the microphone array. The parameters of the microphone array may include an arrangement of the microphone array, a distance between the microphones in the microphone array, a count and positions of the microphones in the microphone array, or the like, or any combination thereof. The mathematical model may be obtained based on an initial mathematical model, the parameters of the microphone array, and parameter information (e.g., frequency information, amplitude information, phase information, etc.) of the sound (e.g., the environmental noise) picked up by the microphone array. For example, the initial mathematical model may include the parameters corresponding to the microphone array, the parameter information of environmental noise picked up by the microphone array, and model parameters. A predicted noise or sound field of the target spatial position may be obtained by bringing the parameters of the microphone array, the parameter information of the sound picked up by the microphone array, and initial values of the model parameters into the initial mathematical model. The predicted noise or sound field may be compared with the data (the noise and the estimated sound field) obtained from the physical microphone set at the target spatial position so as to adjust the model parameters of the mathematical model. Based on the above adjustment manner, the mathematical model may be obtained through a plurality of adjustments based on a large amount of data (e.g., parameters of the microphone array and parameter information of environmental noise picked up by the microphone array).

In some embodiments, the virtual microphone may include a machine learning model. The machine learning model may be obtained through training based on the parameters of the microphone array and the parameter information (e.g., frequency information, amplitude information, phase information, etc.) of sound (e.g., the environmental noise) picked up by the microphone array. For example, the machine learning model may be obtained by training an initial machine learning model (e.g., a neural network model) using the parameters of the microphone array and the parameter information of the sound picked up by the microphone array as training samples. Specifically, the parameters of the microphone array and the parameter information of the sound picked up by the microphone array may be input into the initial machine learning model, and a prediction result (e.g., the noise and the estimated sound field of the target spatial position) may be obtained. Then, the prediction result may be compared with the data (the noise and the estimated sound field) obtained from the physical microphone set at the target spatial position so as to adjust parameters of the initial machine learning model. Based on the above adjustment manner and using a large amount of data (e.g., the parameters of the microphone array and the parameter information of the environmental noise picked up by the microphone array), after many iterations, the parameters of the initial machine learning model may be optimized until the prediction result of the initial machine learning model is the same as or similar to the data obtained by the physical microphone set at the target spatial position, and the machine learning model may be obtained.

A virtual microphone technology may avoid placing the physical microphone at a position (e.g., the target spatial position) where it is difficult to place a microphone. For example, in order to open the user's ears without blocking the user's ear canal, the physical microphone may not be set at a position where the user's earhole is located (e.g., the target spatial position). In such cases, the microphone array may be set at a position close to the user's ear without blocking the ear canal through the virtual microphone technology, and then a virtual microphone at the position where the user's earhole is located may be constructed through the microphone array. The virtual microphone may predict sound data (e.g., an amplitude, a phase, a sound pressure, a sound field, etc.) at a second position (e.g., the target spatial position) using a physical microphone (e.g., the first microphone array 320) at a first position. In some embodiments, the sound data of the second position (which may also be referred to as a specific position, such as the target spatial position) predicted by the virtual microphone may be adjusted according to a distance between the virtual microphone and the physical microphone (the first microphone array 320), a type of the virtual microphone (e.g. a mathematical model-based virtual microphone, a machine learning-based virtual microphone), etc. For example, the closer the distance between the virtual microphone and the physical microphone, the more accurate the sound data of the second position predicted by the virtual microphone. As another example, in some specific application scenarios, the sound data of the second position predicted by the machine learning-based virtual microphone may be more accurate than that of the mathematical model-based virtual microphone. In some embodiments, the position corresponding to the virtual microphone (i.e., the second position, e.g., the target spatial position) may be near the first microphone array 320, or may be far away from the first microphone array 320.

In 1620, noise and a sound field of a target spatial position may be estimated based on the virtual microphone. In some embodiments, the operation may be performed by the processor 330.

In some embodiments, if the virtual microphone is a mathematical model, the processor 330 may take the parameter information (e.g. frequency information, amplitude information, phase information, etc.) of the environmental noise picked up by the first microphone array (e.g., the first microphone array 320) and the parameters (e.g., an arrangement of the first microphone array, a distance between the microphones, a count of the microphones in the first microphone array) of the first microphone array as parameters of the mathematical model and input them into the mathematical model in real time to estimate the noise and the sound field of the target spatial position.

In some embodiments, if the virtual microphone is a machine learning model, the processor 330 may input the parameter information (e.g. frequency information, amplitude information, phase information, etc.) of the environmental noise picked up by the first microphone array and the parameters (e.g., an arrangement of the first microphone array, a distance between the microphones, a count of the microphones in the first microphone array) of the first microphone array into the machine learning model in real time to estimate the noise and the sound field of the target spatial position.

It should be noted that the above description of the process 1600 is merely provided for the purpose of illustration, and is not intended to limit the scope of the present disclosure. For persons having ordinary skills in the art, a plurality of modifications and variations may be made to the process 1600 under the teachings of the present disclosure. For example, the operation 1620 may be divided into two operations to estimate the noise and the sound field of the target spatial position, respectively. However, those modifications and variations do not depart from the scope of the present disclosure.

In some embodiments, the speaker 340 may output a target signal based on a noise reduction signal. After the target signal is cancelled with the environmental noise, there may still be a part of the sound signal near the user's ear canal that has not been canceled. The uncancelled sound signal may be residual environmental noise and/or a residual target signal, so there may be still a certain amount of noise at the user's ear canal. Based on this, in some embodiments, the earphone 100 shown in FIG. 1 and the earphone 300 shown in FIGS. 3-12 may further include a second microphone 360. The second microphone 360 may be located in the body part (e.g., the holding component 122). The second microphone 360 may be configured to pick up the environmental noise and the target signal.

In some embodiments, a count of the second microphones 360 may be one or more. When the count of the second microphones 360 is one, the second microphone may be configured to pick up the environmental noise and the target signal at the user's ear canal, so as to monitor the sound field at the user's ear canal after the target signal is cancelled with the environment noise. When the count of the second microphones 360 is multiple, the multiple second microphones may be configured to pick up the environmental noise and the target signal at the user's ear canal. Relevant parameter information of the sound signal at the user's ear canal picked up by the multiple second microphones may be configured to estimate noise at the user's ear canal by averaging, weighting, etc. In some embodiments, when the count of the second microphones 360 is multiple, some of the multiple second microphones may be configured to pick up the environmental noise and the target signal at the user's ear canal, and the rest of the multiple second microphones may be designated as microphones in the first microphone array 320. In such cases, the first microphone array 320 and the second microphone 360 may share one or more same microphones.

In some embodiments, as shown in FIG. 10, the second microphone 360 may be disposed in a second target region, and the second target region may be a region on the holding component 3122 close to the user's ear canal. In some embodiments, the second target region may be a region H in FIG. 10. The region H may be a partial region of the holding component 3122 close to the user's ear canal. That is, the second microphone 360 may be located at the holding component 3122. For example, the region H may be a partial region in the first region 3122A on the side of the holding component 3122 facing the user's ear. By disposing the second microphone 360 in the second target region H, the second microphone 360 may be located near the user's ear canal and closer to the user's ear canal than the first microphone array 320, thereby ensuring that the sound signal (e.g. the residual environmental noise, the residual target signal, etc.) picked up by the second microphone 360 is more consistent with the sound heard by the user. The processor 330 may further update the noise reduction signal according to the sound signal picked up by the second microphone 360, so as to achieve a more ideal noise reduction effect.

In some embodiments, in order to ensure that the second microphone 360 can more accurately pick up the residual environmental noise in the user's ear canal, a position of the second microphone 360 on the holding component 3122 may be adjusted so that a distance between the second microphone 360 and the user's ear canal may be within an appropriate range. In some embodiments, when the user wears the earphone 300, the distance between the second microphone 360 and the user's ear canal may be less than 10 mm. In some embodiments, when the user wears the earphone 300, the distance between the second microphone 360 and the user's ear canal may be less than 9 mm. In some embodiments, when the user wears the earphone 300, the distance between the second microphone 360 and the user's ear canal may be less than 8 mm. In some embodiments, when the user wears the earphone 300, the distance between the second microphone 360 and the user's ear canal may be less than 7 mm.

In some embodiments, the second microphone 360 may need to pick up the residual target signal after the target signal output by the speaker 340 through the sound outlet hole 301 is cancelled with the environmental noise. In order to ensure that the second microphone 360 can pick up the residual target signal more accurately, a distance between the second microphone 360 and the sound outlet hole 301 may be set reasonably. In some embodiments, on the sagittal plane (the YZ plane) of the user, a distance between the second microphone 360 and the sound outlet hole 301 along the sagittal axis (the Y-axis) direction may be less than 10 mm. In some embodiments, on the sagittal plane (the YZ plane) of the user, the distance between the second microphone 360 and the sound outlet hole 301 along the sagittal axis (the Y-axis) direction may be less than 9 mm. In some embodiments, on the sagittal plane (the YZ plane) of the user, the distance between the second microphone 360 and the sound outlet hole 301 along the sagittal axis (the Y-axis) direction may be less than 8 mm. In some embodiments, on the sagittal plane (the YZ plane) of the user, the distance between the second microphone 360 and the sound outlet hole 301 along a sagittal axis (the Y-axis) direction may be less than 7 mm.

In some embodiments, on the sagittal plane of the user, the distance between the second microphone 360 and the sound outlet hole 301 along the vertical axis (the Z-axis) direction may be in a range of 3 mm to 6 mm. In some embodiments, on the sagittal plane of the user, the distance between the second microphone 360 and the sound outlet hole 301 along the vertical axis (the Z-axis) direction may be in a range of 2.5 mm to 5.5 mm. In some embodiments, on the sagittal plane of the user, the distance between the second microphone 360 and the sound outlet hole 301 along the vertical axis (the Z-axis) direction may be in a range of 3 mm to 5 mm. In some embodiments, on the sagittal plane of the user, the distance between the second microphone 360 and the sound outlet hole 301 along the vertical axis (the Z-axis) direction may be in a range of 3.5 mm to 4.5 mm.

In some embodiments, in order to ensure the active noise reduction performance of the earphone 300, on the sagittal plane of the user, a distance between the second microphone 360 and the first microphone array 320 along the vertical axis (the Z-axis) direction may be in a range of 2 mm to 8 mm. In some embodiments, on the sagittal plane of the user, the distance between the second microphone 360 and the first microphone array 320 along the vertical axis (the Z-axis) direction may be in a range of 3 mm to 7 mm. In some embodiments, on the sagittal plane of the user, the distance between the second microphone 360 and the first microphone array 320 along the vertical axis (the Z-axis) direction may be in a range of 4 mm to 6 mm.

In some embodiments, on the sagittal plane of the user, a distance between the second microphone 360 and the first microphone array 320 along the sagittal axis (the Y-axis) direction may be in a range of 2 mm to 20 mm. In some embodiments, on the sagittal plane of the user, the distance between the second microphone 360 and the first microphone array 320 along the sagittal axis (the Y-axis) direction may be in a range of 4 mm to 18 mm. In some embodiments, on the sagittal plane of the user, the distance between the second microphone 360 and the first microphone array 320 along the sagittal axis (the Y-axis) direction may be in a range of 5 mm to 15 mm. In some embodiments, on the sagittal plane of the user, the distance between the second microphone 360 and the first microphone array 320 along the sagittal axis (the Y-axis) direction may be in a range of 6 mm to 12 mm. In some embodiments, on the sagittal plane of the user, the distance between the second microphone 360 and the first microphone array 320 along the sagittal axis (the Y-axis) direction may be in a range of 8 mm to 10 mm.

In some embodiments, on the cross section (the XY plane) of the user, a distance between the second microphone 360 and the first microphone array 320 along the coronal axis (the X-axis) direction may be less than 3 mm. In some embodiments, on the cross section (the XY plane) of the user, the distance between the second microphone 360 and the first microphone array 320 along the coronal axis (the X-axis) direction may be less than 2.5 mm. In some embodiments, on the cross section (XY plane) of the user, the distance between the second microphone 360 and the first microphone array 320 along the coronal axis (the X-axis) direction may be less than 2 mm. It can be understood that the distance between the second microphone 360 and the first microphone array 320 may be a distance between the second microphone 360 and any microphone in the first microphone array 320.

In some embodiments, the second microphone 360 may be configured to pick up the environmental noise and the target signal. Further, the processor 330 may update the noise reduction signal based on the sound signal picked up by the second microphone 360, thereby further improving the active noise reduction performance of the earphone 300. Detailed description regarding updating the noise reduction signal using the second microphone 360 may be found in FIG. 17 and relevant descriptions thereof.

Figure 17:
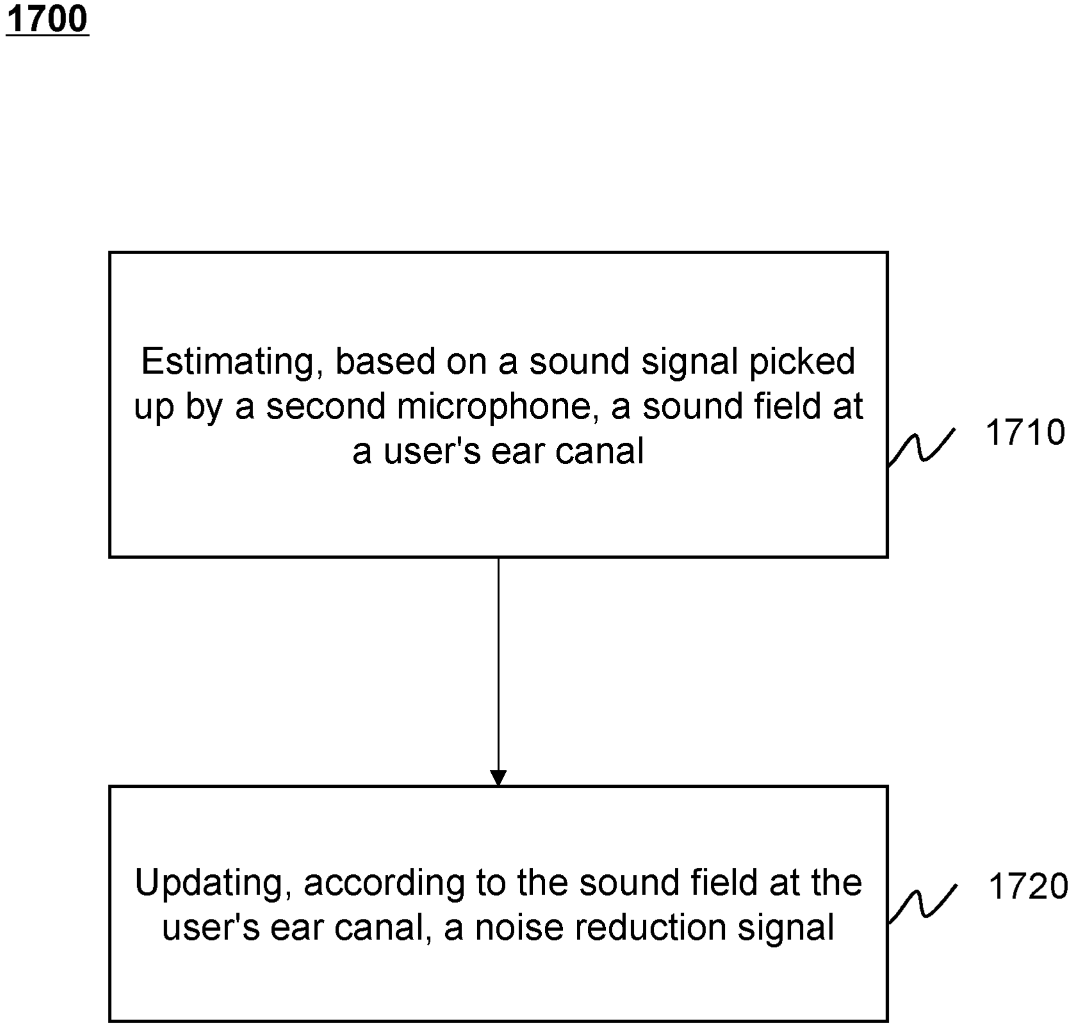
FIG. 17 is a flowchart illustrating an exemplary process for updating a noise reduction signal according to some embodiments of the present disclosure.

FIG. 17 is a flowchart illustrating an exemplary process for updating a noise reduction signal according to some embodiments of the present disclosure. As shown in FIG. 17, the process 1700 may include the following operations.

In 1710, a sound field at a user's ear canal may be estimated based on a sound signal picked up by the second microphone 360.

In some embodiments, the operation may be performed by the processor 330. In some embodiments, the sound signal picked up by the second microphone 360 may include environmental noise and a target signal output by the speaker 340. In some embodiments, after the environmental noise is cancelled with the target signal output by the speaker 340, there may still be a part of the sound signal near the user's ear canal that has not been canceled. The uncancelled sound signal may be residual environmental noise and/or a residual target signal, so that there may still be a certain amount of noise at the user's ear canal after the environmental noise is cancelled with the target signal. The processor 330 may process the sound signal (e.g., the environmental noise, the target signal) picked up by the second microphone 360 to obtain parameter information (e.g., frequency information, amplitude information, phase information, etc.) of the sound field at the user's ear canal, so as to estimate the sound field at the user's ear canal.

In 1720, a noise reduction signal may be updated according to the sound field at the user's ear canal.

In some embodiments, the operation 1720 may be performed by the processor 330. In some embodiments, the processor 330 may adjust the parameter information of the noise reduction signal according to the parameter information (e.g. the frequency information, the amplitude information, and/or the phase information) of the sound field at the user's ear canal obtained in operation 1710, so that the amplitude information and the frequency information of the updated noise reduction signal may be more consistent with amplitude information and frequency information of the environmental noise at the user's ear canal, and the phase information of the updated noise reduction signal may be more consistent with inverse phase information of the environmental noise at the user's ear canal. Therefore, the updated noise reduction signal may more accurately eliminate the environmental noise.

It should be noted that the above description of the process 1700 is merely provided for the purpose of illustration, and is not intended to limit the scope of the present disclosure. For persons having ordinary skills in the art, a plurality of modifications and variations may be made to the process 1700 under the teachings of the present disclosure. However, those modifications and variations do not depart from the scope of the present disclosure. For example, the microphone that picks up the sound field at the user's ear canal may be not limited to the second microphone 360, and may also include other microphones, such as a third microphone, a fourth microphone, etc. The relevant parameter information of the sound field at the user's ear canal picked up by the multiple microphones may be configured to estimate the sound field at the user's ear canal by means of averaging, weighting, etc.

In some embodiments, in order to obtain the sound field at the user's ear canal more accurately, the second microphone 360 may include a microphone that is closer to the user's ear canal than any microphone in the first microphone array 320. In some embodiments, the sound signal picked up by the first microphone array 320 may be the environmental noise, and the sound signal picked up by the second microphone 360 may be the environmental noise and the target signal. In some embodiments, the processor 330 may estimate the sound field at the user's ear canal according to the sound signal picked up by the second microphone 360 to update the noise reduction signal. The second microphone 360 may need to monitor the sound field at the user's ear canal after the noise reduction signal is cancelled with the environmental noise. The second microphone 360 may include a microphone that is closer to the user's ear canal than any microphone in the first microphone array 320, which may more accurately represent the sound signal heard by the user. The noise reduction signal may be updated by estimating the sound field of the second microphone 360, which can further improve the noise reduction effect and the user's listening experience.

In some embodiments, the first microphone array may be omitted, and the earphone 300 may perform the active noise reduction merely using the second microphone 360. In such cases, the processor 330 may regard the environmental noise picked up by the second microphone 360 as the noise at the user's ear canal and generate a feedback signal based on the environmental noise to adjust the noise reduction signal, so as to cancel or reduce the environmental noise at the user's ear canal. For example, when a count of the second microphones 360 is more than one, some of the multiple second microphones 360 may be configured to pick up the environmental noise near the user's ear canal. The rest of the multiple second microphones 360 may be configured to pick up the environmental noise and the target signal at the user's ear canal, so that the processor 330 may update the noise reduction signal according to the sound signal at the user's ear canal after the target signal is cancelled with the environmental noise, thereby improving the active noise reduction performance of the earphone 300.

Figure 18:
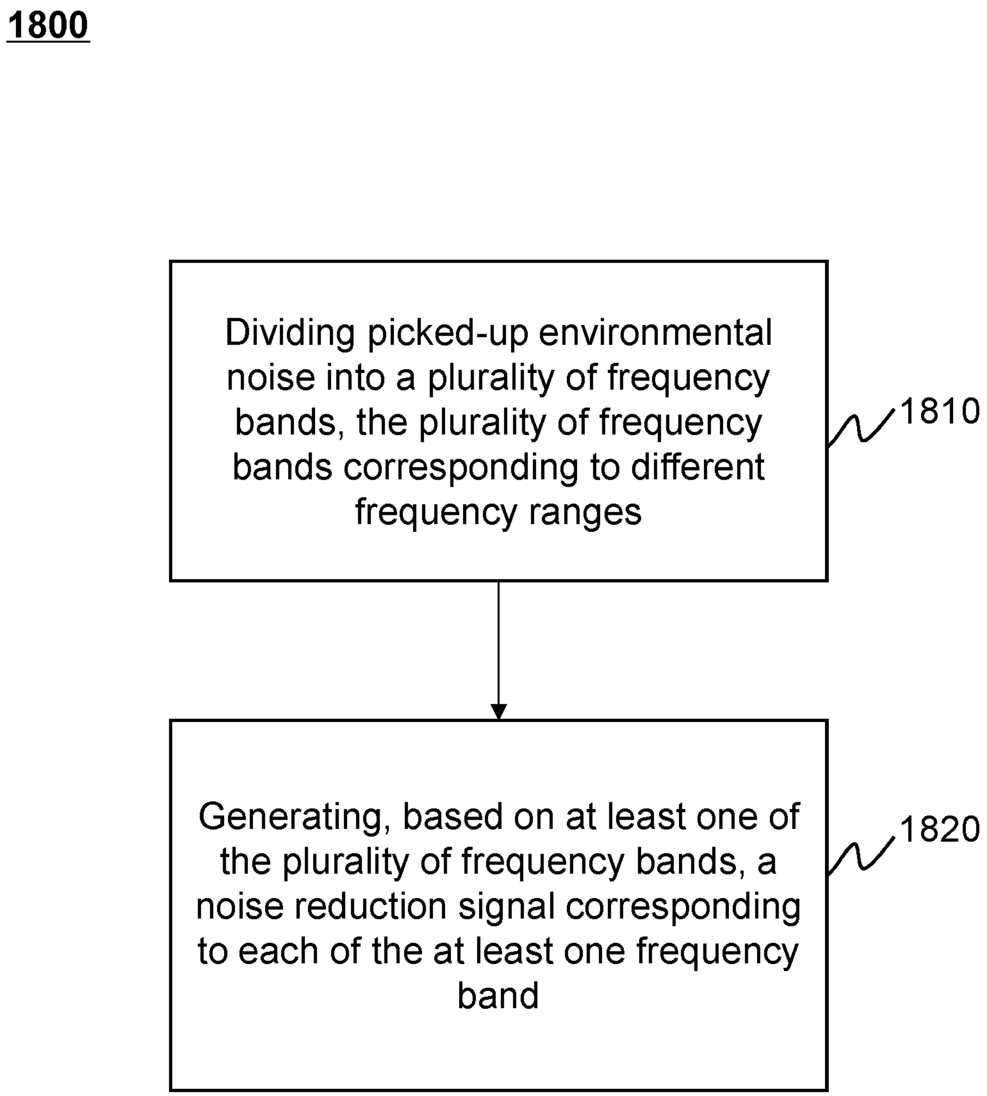
FIG. 18 is a flowchart illustrating an exemplary process for reducing noise of an earphone according to some embodiments of the present disclosure.

FIG. 18 is a flowchart illustrating an exemplary process for reducing noise of an earphone according to some embodiments of the present disclosure. As shown in FIG. 18, the process 1800 may include the following operations.

In 1810, the picked-up environmental noise may be divided into a plurality of frequency bands. The plurality of frequency bands may correspond to different frequency ranges.

In some embodiments, the operation may be performed by the processor 330. The environmental noise picked up by a microphone array (e.g., the first microphone array 320) may include different frequency components. In some embodiments, when processing the environmental noise signal, the processor 330 may divide a total frequency band of environmental noise into the plurality of frequency bands. Each frequency band may correspond to a different frequency range. A frequency range corresponding to each frequency band may be a preset frequency range, for example, 20 HZ-100 Hz, 100 Hz-1000 Hz, 3000 Hz-6000 Hz, 9000 Hz-20000 Hz, etc.

In 1820, a noise reduction signal corresponding to each of the at least one frequency band may be generated based on at least one of the plurality of frequency bands.

In some embodiments, the operation may be performed by the processor 330. The processor 330 may determine parameter information (e.g., frequency information, amplitude information, phase information, etc.) of the environmental noise corresponding to each frequency band by analyzing the frequency bands divided from the environmental noise. The processor 330 may generate the noise reduction signal corresponding to each of the at least one frequency band according to the parameter information. For example, in the frequency band of 20 Hz-100 Hz, the processor 330 may generate a noise reduction signal corresponding to the frequency band 20 Hz-100 Hz based on parameter information (e.g., frequency information, amplitude information, phase information, etc.) of the environmental noise corresponding to the frequency band 20 Hz-100 Hz. Further, the speaker 340 may output a target signal based on the noise reduction signal in the frequency band of 20 Hz-100 Hz. For example, the speaker 340 may output the target signal with approximately opposite phase and similar amplitude to the noise in the frequency band 20 Hz-100 Hz to cancel the noise in the frequency band.

In some embodiments, to generate, based on at least one of the plurality of frequency bands, the noise reduction signal corresponding to each of the at least one frequency band, the processor 330 may determine sound pressure levels corresponding to the plurality of frequency bands, and generate the noise reduction signal corresponding to each of the at least one frequency band based on the sound pressure levels corresponding to the plurality of frequency bands and the frequency ranges corresponding to the plurality of frequency bands. The at least one frequency band may be part of plurality of frequency bands. In some embodiments, the sound pressure levels of the environmental noise in different frequency bands picked up by the microphone array (e.g., the first microphone array 320) may be different. The processor 330 may determine the sound pressure level corresponding to each frequency band by analyzing the frequency bands divided from the environmental noise. In some embodiments, considering a difference in a structure of an open earphone (e.g., the earphone 300) and a change of a transmission function caused by a difference in a wearing position of the open earphone due to a difference in the user's ear structure, the earphone 300 may select partial frequency bands of the plurality of frequency bands of the environmental noise to perform the active noise reduction. The processor 330 may generate a noise reduction signal corresponding to each frequency band based on the sound pressure levels and the frequency ranges of the plurality of frequency bands. Each frequency band may be part of the plurality of frequency bands of the environmental noise. For example, when the low-frequency noise (e.g., 20 Hz-100 Hz) in the environmental noise is relatively loud (e.g., the sound pressure level is greater than 60 dB), the open earphone may not emit a sufficiently large noise reduction signal to cancel the low-frequency noise. In this case, the processor 330 may generate a noise reduction signal corresponding to a relatively high frequency part of the frequency band (e.g., 100 Hz-1000 Hz, 3000 Hz-6000 Hz) in the environmental noise frequency bands. As another example, the different wearing positions of the earphone caused by the differences in the user's ear structure may lead to changes in the transmission function, which may make it difficult for the open earphone to perform the active noise reduction on the environmental noise with high-frequency signals (e.g., greater than 2000 Hz). In this case, the processor 330 may generate a noise reduction signal corresponding to a relatively low frequency part of the frequency band (e.g., 20 Hz-100 Hz) in the environmental noise frequency bands.

It should be noted that the above description of the process 1800 is merely provided for the purpose of illustration, and is not intended to limit the scope of the present disclosure. For persons having ordinary skills in the art, a plurality of modifications and variations may be made to the process 1800 under the teachings of the present disclosure. For example, the operations 1810 and 1820 may be combined. As another example, other operations may be added to the process 1800. However, those modifications and variations do not depart from the scope of the present disclosure.

Figure 19:
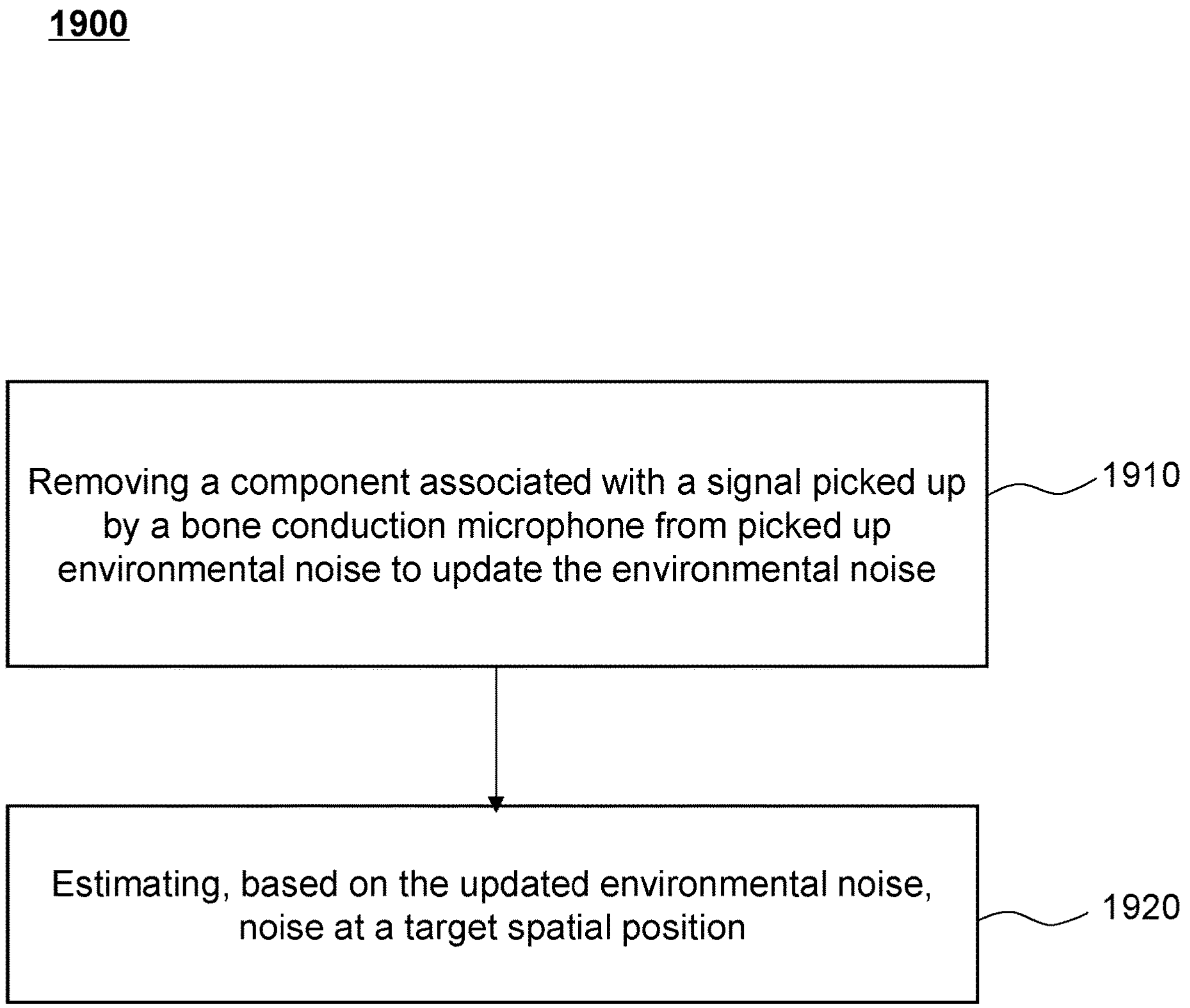
FIG. 19 is a flowchart illustrating an exemplary process for estimating noise at a target spatial position according to some embodiments of the present disclosure.

FIG. 19 is a flowchart illustrating an exemplary process for estimating noise at a target spatial position according to some embodiments of the present disclosure. As shown in FIG. 19, the process 1900 may include the following operations.

In 1910, a component associated with a signal picked up by a bone conduction microphone may be removed from picked up environmental noise to update the environmental noise.

In some embodiments, the operation may be performed by the processor 330. In some embodiments, when a microphone array (e.g., the first microphone array 320) picks up the environmental noise, the user's own voice may also be picked up by the microphone array, that is, the user's own voice may also be regarded as a part of the environmental noise. In this case, a target signal output by a speaker (e.g., the speaker 340) may cancel the user's own voice. In some embodiments, in certain scenarios, the user's own voice may need to be preserved, for example, in scenarios such as the user making a voice call, sending a voice message, etc. In some embodiments, an earphone (e.g., the earphone 300) may include a bone conduction microphone. When the user wears the earphone to make a voice call or record voice information, the bone conduction microphone may pick up the sound signal of the user's voice by picking up a vibration signal generated by facial bones or muscles when the user speaks, and transmit the sound signal to the processor 330. The processor 330 may obtain parameter information from the sound signal picked up by the bone conduction microphone, and remove sound signal components associated with the sound signal picked up by the bone conduction microphone from the environmental noise picked up by the microphone array. The processor 330 may update the environmental noise according to the parameter information of the remaining environmental noise. The updated environmental noise may no longer include the sound signal of the user's own voice, that is, the user may hear the sound signal of the user's own voice when the user makes a voice call.

In 1920, noise at a target spatial position may be estimated based on the updated environmental noise.

In some embodiments, the operation may be performed by the processor 330. The operation 1920 may be performed in a similar manner to the operation 1420, which will not be repeated herein.

It should be noted that the above description of the process 1900 is merely provided for the purpose of illustration, and is not intended to limit the scope of the present disclosure. For persons having ordinary skills in the art, a plurality of modifications and variations may be made to the process 1900 under the teachings of the present disclosure. For example, the components associated with the signal picked up by the bone conduction microphone may also be preprocessed, and the signal picked up by the bone conduction microphone may be transmitted to a terminal device as an audio signal. However, those modifications and variations do not depart from the scope of the present disclosure.

In some embodiments, the noise reduction signal may also be updated based on a manual input of the user. For example, in some embodiments, different users may have different effects of the active noise reduction of the earphone 300 due to the difference in the ear structure or the wearing state of the earphone 300, resulting in an unsatisfactory listening experience. In such cases, the user may manually adjust the parameter information (e.g., the frequency information, the phase information, or the amplitude information) of the noise reduction signal according to their own listening feelings, so as to match wearing positions of different users wearing the earphone 300 and improve the active noise reduction performance of the earphone 300. As another example, when a special user (e.g., a hearing-impaired user or an older user) is using the earphone 300, an hearing ability of the special user may be different from an hearing ability of an ordinary user, and the noise reduction signal generated by the earphone 300 itself may not match the hearing ability of the special user, resulting in poor listening experience of the special user. In this case, the special user may manually adjust the frequency information, the phase information, or the amplitude information of the noise reduction signal according to his/her own listening feeling, so as to update the noise reduction signal to improve the listening experience of the special user. In some embodiments, the user may manually adjust the noise reduction signal by manually adjusting through keys on the earphone 300. In some embodiments, any position (e.g., a side surface of the holding component 3122 facing away from the ear) of the fixing structure 310 of the earphone 300 may be provided with a key that can be adjusted by the user, so as to adjust the effect of the active noise reduction of the earphone 300, thereby improving the listening experience of the user using the earphone 300. In some embodiments, the user may manually adjust the noise reduction signal by manually inputting information through a terminal device. In some embodiments, the earphone 300 or an electronic product (e.g., a mobile phone, a tablet computer, a computer, etc.) that communicates with the earphone 300 may display the sound field at the ear canal of the user, and feedback the suggested frequency information range, the amplitude information range, or the phase information range of the noise reduction signal to the user. The user may manually input the parameter information of the suggested noise reduction signal, and then fine-tune the parameter information according to his/her own listening experience.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block," "module," "engine," "unit," "component," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An earphone, comprising:

a fixing structure configured to fix the earphone near a user's ear without blocking the user's ear canal and including a hook-shaped component and a body part, wherein when the user wears the earphone, the hook-shaped component is hung between a first side of the ear and a head of the user, and the body part contacts a second side of the ear;

a first microphone array located in the body part and configured to pick up environmental noise;

a processor located in the hook-shaped component or the body part and configured to:

estimate a sound field at a target spatial position using the first microphone array, the target spatial position being closer to the user's ear canal than any microphone in the first microphone array, and generate, based on the estimated sound field at the target spatial position, a noise reduction signal; and a speaker located in the body part and configured to output a target signal according to the noise reduction signal, the target signal being transmitted to outside of the earphone through a sound outlet hole for reducing the environmental noise.

2. The earphone of claim 1, wherein the body part includes a connecting component and a holding component, wherein when the user wears the earphone, the holding component contacts the second side of the ear, and the connecting component connects the hook-shaped component and the holding component.

3. The earphone of claim 2, wherein a pressure relief hole is provided on a side of the holding component along a vertical axis direction and close to a top of the user's head, and the pressure relief hole is farther away from the user's ear canal than the sound outlet hole.

4. The earphone of the claim 3, wherein the pressure relief hole and the sound outlet hole form an acoustic dipole, the first microphone array is disposed in a first target region, and the first target region is an acoustic zero point position of a radiated sound field of the acoustic dipole.

5. The earphone of claim 1, wherein to generate, based on the estimated sound field at the target spatial position, a noise reduction signal, the processor is configured to:

estimate, based on the picked-up environmental noise, noise at the target spatial position; and generate, based on the noise at the target spatial position and the estimated sound field at the target spatial position, the noise reduction signal.

6. The earphone of claim 5, wherein the earphone further includes one or more sensors located in the hook-shaped component and/or the body part and configured to obtain motion information of the earphone, and the processor is further configured to:

update, based on the motion information, the noise at the target spatial position and the estimated sound field at the target spatial position; and generate, based on the updated noise at the target spatial position and the updated estimated sound field at the target spatial position, the noise reduction signal.

7. The earphone of claim 5, wherein to estimate, based on the picked-up environmental noise, noise at the target spatial position, the processor is configured to:

determine one or more spatial noise sources associated with the picked-up environmental noise; and estimate, based on the one or more spatial noise sources, the noise at the target spatial position.

8. The earphone of claim 1, wherein to estimate a sound field at a target spatial position using the first microphone array, the processor is configured to:

construct, based on the first microphone array, a virtual microphone, wherein the virtual microphone includes a mathematical model or a machine learning model and is configured to represent audio data collected by the microphone if the target spatial position includes the microphone; and estimate, based on the virtual microphone, the sound field of the target spatial position.

9. The earphone of claim 8, wherein to generate, based on the estimated sound field at the target spatial position, a noise reduction signal, the processor is configured to:

estimate, based on the virtual microphone, noise at the target spatial position; and generate, based on the noise at the target spatial position and the estimated sound field at the target spatial position, the noise reduction signal.

10. The earphone of claim 2, wherein the earphone includes a second microphone located in the body part and configured to pick up the environmental noise and the target signal; and the processor is configured to:

update, based on a sound signal picked up by the second microphone, the noise reduction signal.

11. The earphone of claim 10, wherein the second microphone includes at least one microphone closer to the user's ear canal than any microphone in the first microphone array.

12. The earphone of claim 10, wherein the second microphone is disposed in a second target region, and the second target area is a region on the holding component close to the user's ear canal.

13. The earphone of claim 12, wherein when the user wears the earphone, a distance between the second microphone and the user's ear canal is less than 10 mm.

14. The earphone of claim 12, wherein on a sagittal plane of the user, a distance between the second microphone and the sound outlet hole along a sagittal axis direction is less than 10 mm.

15. The earphone of claim 12, wherein on a sagittal plane of the user, a distance between the second microphone and the sound outlet hole along a vertical axis direction is in a range of 2 mm to 5 mm.

16. The earphone of claim 10, wherein to update, based on a sound signal picked up by the second microphone, the sound reduction signal, the processor is configured to:

estimate, based on the sound signal picked up by the second microphone, a sound field at the user's ear canal; and update, according to the sound field at the user's ear canal, the noise reduction signal.

17. The earphone of claim 1, wherein to generate, based on the estimated sound field at the target spatial position, a noise reduction signal, the processor is configured to:

divide the picked-up environmental noise into a plurality of frequency bands, the plurality of frequency bands corresponding to different frequency ranges; and generate, based on at least one of the plurality of frequency bands, the noise reduction signal corresponding to each of the at least one frequency band.

18. The earphone of claim 17, wherein to generate, based on at least one of the plurality of frequency bands, the noise reduction signal corresponding to each of the at least one frequency band, the processor is configured to:

obtain sound pressure levels of the plurality of frequency bands; and generate, based on the sound pressure levels of the plurality of frequency bands and the frequency ranges of the plurality of frequency bands, the noise reduction signal corresponding to each of the at least one frequency band, wherein the at least one frequency band is part of the plurality of frequency bands.

19. The earphone of claim 5, wherein the earphone includes a second microphone located in the body part and configured to pick up the environmental noise and the target signal, the first microphone array or the second microphone includes a bone conduction microphone configured to pick up a voice of the user, and to estimate, based on the picked-up environmental noise, noise at the target spatial position, the processor is configured to:

remove components associated with a signal picked up by the bone conduction microphone from the picked up environmental noise to update the environmental noise; and estimate, based on the updated environmental noise, the noise at the target spatial position.

20. The earphone of claim 1, wherein the earphone further includes an adjustment module configured to obtain an input of a user; and the processor is further configured to:

adjust the noise reduction signal according to the input of the user.

* * * * *